United States Patent
Kihara et al.

(10) Patent No.: US 10,185,839 B2
(45) Date of Patent: Jan. 22, 2019

(54) CONTENT DISTRIBUTION METHOD, CONTENT DISTRIBUTION APPARATUS, AND STORAGE MEDIUM

(71) Applicant: FUJITSU LIMITED, Kawasaki-shi, Kanagawa (JP)

(72) Inventors: Hideto Kihara, Kawasaki (JP); Takashi Ohno, Kobe (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/061,066

(22) Filed: Mar. 4, 2016

(65) Prior Publication Data

US 2016/0267288 A1   Sep. 15, 2016

(30) Foreign Application Priority Data

Mar. 11, 2015   (JP) .................................. 2015-048106

(51) Int. Cl.
*G06F 21/62*   (2013.01)
*H04L 12/18*   (2006.01)
(Continued)

(52) U.S. Cl.
CPC .......... *G06F 21/6218* (2013.01); *G06F 21/33* (2013.01); *G06F 21/35* (2013.01);
(Continued)

(58) Field of Classification Search
CPC ......... G06F 21/6218; G06F 2221/2111; H04L 63/0807; H04L 12/1831; H04L 12/1822; H04L 63/107; H04L 12/16; H04L 12/1818; H04L 12/1845; H04L 29/08657; H04W 12/06; H04W 4/02–4/025; G07C 9/00; G06Q 20/3224; G06Q 10/02; G06Q 20/327–20/3278

See application file for complete search history.

(56) References Cited

U.S. PATENT DOCUMENTS

| | | | |
|---|---|---|---|
| 8,363,086 B1 * | 1/2013 | Shah | H04L 67/141 348/14.02 |
| 8,407,773 B1 * | 3/2013 | Hayter | H04L 67/16 726/7 |

(Continued)

FOREIGN PATENT DOCUMENTS

| | | |
|---|---|---|
| JP | 09-200350 | 7/1997 |
| JP | 2010-113682 | 5/2010 |

(Continued)

OTHER PUBLICATIONS

Notification of Reasons for Refusal for Japanese Patent Application No. 2015-048106 dated Oct. 30, 2018.

*Primary Examiner* — Nelson Giddins
(74) *Attorney, Agent, or Firm* — Staas & Halsey LLP

(57) ABSTRACT

A content distribution method including: receiving, from a terminal, first information indicating an attribute of a user of the terminal, transmitting, to the terminal, second information relating to the attribute of the user of the terminal based on the first information, receiving, from the terminal, the second information and third information indicating a location of the terminal, and transmitting a content that is selected from among a plurality of contents based on the received second information and the received third information.

19 Claims, 24 Drawing Sheets

(51) Int. Cl.
  *H04W 4/02* (2018.01)
  *H04W 12/06* (2009.01)
  *H04L 29/06* (2006.01)
  *G06F 21/33* (2013.01)
  *G06F 21/35* (2013.01)
  *G06Q 10/00* (2012.01)
  *H04W 4/80* (2018.01)
  *G07C 9/00* (2006.01)
  *H04W 4/00* (2018.01)

(52) U.S. Cl.
  CPC ......... *G06Q 10/00* (2013.01); *H04L 12/1831* (2013.01); *H04L 63/0807* (2013.01); *H04L 63/107* (2013.01); *H04W 12/06* (2013.01); *G06F 2221/2111* (2013.01); *G07C 9/00* (2013.01); *H04L 12/1822* (2013.01); *H04W 4/008* (2013.01); *H04W 4/02* (2013.01); *H04W 4/80* (2018.02)

(56) References Cited

U.S. PATENT DOCUMENTS

| | | | | |
|---|---|---|---|---|
| 8,713,098 | B1* | 4/2014 | Adya | H04L 63/0807 707/610 |
| 8,752,133 | B2* | 6/2014 | An | H04L 63/102 726/2 |
| 8,812,015 | B2* | 8/2014 | Das | H04W 4/029 455/456.1 |
| 8,874,144 | B1* | 10/2014 | Liu | H04W 4/029 455/456.3 |
| 9,261,262 | B1* | 2/2016 | Baloga | G06F 1/16 |
| 9,548,859 | B2* | 1/2017 | Medvinsky | G06F 21/10 |
| 9,633,216 | B2* | 4/2017 | Gokhale | G06F 11/1448 |
| 9,705,950 | B2* | 7/2017 | Trammell | H04N 21/25841 |
| 2006/0293065 | A1* | 12/2006 | Chew | G06Q 30/02 455/456.3 |
| 2007/0027925 | A1* | 2/2007 | Spencer | G06F 17/3087 |
| 2007/0083613 | A1* | 4/2007 | Kuriya | G06Q 30/06 709/217 |
| 2008/0301580 | A1* | 12/2008 | Hjelmeland Alams | G06Q 10/107 715/808 |
| 2010/0138903 | A1* | 6/2010 | Medvinsky | G06F 21/10 726/6 |
| 2010/0293246 | A1* | 11/2010 | Urazoe | G06F 21/6218 709/217 |
| 2010/0315549 | A1* | 12/2010 | Basso | H04N 21/2389 348/445 |
| 2011/0081919 | A1* | 4/2011 | Das | H04W 4/029 455/456.1 |
| 2011/0319098 | A1* | 12/2011 | Potorny | H04W 4/02 455/456.2 |
| 2012/0094598 | A1* | 4/2012 | Tysowski | H04W 4/001 455/41.1 |
| 2013/0156194 | A1* | 6/2013 | Tanioka | G06F 21/32 380/277 |
| 2013/0171932 | A1* | 7/2013 | Park | H04B 5/0031 455/41.1 |
| 2014/0039945 | A1* | 2/2014 | Coady | G06Q 10/02 705/5 |
| 2014/0082188 | A1* | 3/2014 | Gutarin | H04L 67/18 709/224 |
| 2014/0162693 | A1* | 6/2014 | Wachter | H04W 4/04 455/456.3 |
| 2014/0208384 | A1* | 7/2014 | Youssefian | H04L 63/0884 726/3 |
| 2014/0215591 | A1* | 7/2014 | Chen | H04L 9/3234 726/7 |
| 2014/0223020 | A1* | 8/2014 | Hyman | H04L 65/1069 709/228 |
| 2014/0274144 | A1* | 9/2014 | Des Jardins | H04W 4/02 455/456.3 |
| 2014/0278860 | A1* | 9/2014 | Lee | G06Q 30/0214 705/14.16 |
| 2014/0289816 | A1* | 9/2014 | Mazzaferri | G06F 21/6218 726/4 |
| 2014/0289824 | A1* | 9/2014 | Chan | G06F 9/54 726/5 |
| 2014/0289825 | A1* | 9/2014 | Chan | H04W 12/06 726/5 |
| 2014/0337697 | A1* | 11/2014 | Ryu | H04W 4/21 715/205 |
| 2014/0365308 | A1* | 12/2014 | Tsuchiya | H04W 4/21 705/14.64 |
| 2014/0370863 | A1* | 12/2014 | Proctor, Jr. | H04W 4/029 455/414.3 |
| 2015/0065052 | A1* | 3/2015 | Heo | H04W 4/008 455/41.2 |
| 2015/0065172 | A1* | 3/2015 | Do | H04L 63/107 455/456.3 |
| 2015/0073980 | A1* | 3/2015 | Griffin | H04W 4/21 705/39 |
| 2015/0095355 | A1* | 4/2015 | Patton | G06F 17/30241 707/754 |
| 2015/0128194 | A1* | 5/2015 | Kuang | H04N 21/41407 725/81 |
| 2015/0185016 | A1* | 7/2015 | Faaborg | G01C 21/26 701/522 |
| 2015/0264143 | A1* | 9/2015 | Wiesen | H04W 4/021 370/312 |
| 2015/0264573 | A1* | 9/2015 | Giordano | H04L 63/08 726/7 |
| 2015/0269638 | A1* | 9/2015 | Chatterton | G06Q 30/0281 705/5 |
| 2015/0286461 | A1* | 10/2015 | Trammell | H04N 21/8456 700/94 |
| 2015/0312759 | A1* | 10/2015 | Kim | G06F 21/10 455/411 |
| 2015/0319727 | A1* | 11/2015 | Guo | H04W 12/06 455/435.1 |
| 2015/0326704 | A1* | 11/2015 | Ko | H04M 1/7253 455/456.3 |
| 2015/0332029 | A1* | 11/2015 | Coxe | H04L 63/0815 726/9 |
| 2015/0350820 | A1* | 12/2015 | Son | H04W 12/08 455/41.2 |
| 2015/0351007 | A1* | 12/2015 | Bell | H04W 48/14 370/315 |
| 2015/0365787 | A1* | 12/2015 | Farrell | H04W 4/02 455/456.1 |
| 2016/0044450 | A1* | 2/2016 | Huh | H04W 4/02 455/456.3 |
| 2016/0048827 | A1* | 2/2016 | Corbalis | H04W 4/029 705/71 |
| 2016/0057565 | A1* | 2/2016 | Gold | H04W 4/008 455/41.1 |
| 2016/0057571 | A1* | 2/2016 | Florins | H04W 4/021 455/456.3 |
| 2016/0094579 | A1* | 3/2016 | Pate | H04L 63/1441 726/23 |
| 2016/0094943 | A1* | 3/2016 | Cao | H04W 4/021 455/456.1 |
| 2016/0142416 | A1* | 5/2016 | Smith | H04L 63/08 726/9 |
| 2016/0156575 | A1* | 6/2016 | Jeong | H04L 51/10 709/206 |
| 2016/0165381 | A1* | 6/2016 | Kapoor | H04M 1/7253 709/227 |
| 2016/0189136 | A1* | 6/2016 | Mercille | G06Q 20/3227 705/44 |
| 2016/0217397 | A1* | 7/2016 | Peters | G06Q 10/02 |
| 2016/0295358 | A1* | 10/2016 | Cariss | H04W 4/04 |
| 2016/0337812 | A1* | 11/2016 | Nakagawa | H04W 4/029 |
| 2016/0358219 | A1* | 12/2016 | Colligan | G06Q 30/02 |
| 2016/0359933 | A1* | 12/2016 | Gould | H04J 3/245 |
| 2017/0019763 | A1* | 1/2017 | Chi | H04W 4/02 |
| 2017/0041759 | A1* | 2/2017 | Gantert | H04W 4/028 |

(56) References Cited

U.S. PATENT DOCUMENTS

2017/0134510 A1\* 5/2017 Frazier ................... G06F 9/445
2017/0164159 A1\* 6/2017 Mycek ................... H04W 4/21
2017/0208436 A1\* 7/2017 Caine ................... H04W 4/021

FOREIGN PATENT DOCUMENTS

| JP | 2011-113371 | | 6/2011 |
| JP | 2014-178724 | | 9/2014 |
| JP | 2014178724 A | \* | 9/2014 |

\* cited by examiner

FIG. 3

| CONDITION ID | ASSIGNED TICKET |
|---|---|
| TEACHER'S GATE | TEACHER |
| STUDENT'S GATE | STUDENT |
| CLASSROOM | CLASSROOM |
| ⋮ | ⋮ |

| CONDITION ID | CONTENT | PREREQUISITE TICKET |
|---|---|---|
| TEACHER NFC READING | – | – |
| CLASSROOM | TEACHING MEMO 1 | TEACHER |
| | TEACHING MATERIAL 1 | – |
| SCIENCE LABORATORY | CHEMICAL MANAGEMENT TABLE | TEACHER, CHEMICAL ADMINISTRATOR |
| ⋮ | ⋮ | ⋮ |

- "ticketID":"t-1389234673681-76",
- "ticketSort":"com.fujitsu.labs.role",
- "ticketName":"student",
- "expire":"1406594561852",
- "verificationURL":"http://192.168.1.1:8989",

FIG. 12

| IDENTIFICATION INFORMATION | TERMINAL INFORMATION |
|---|---|
| TEACHER | T010 |
| STUDENT A | T020 |
| ⋮ | ⋮ |

| TICKET | AFFECTED CONDITION GROUP |
|---|---|
| TEACHER | IN-SCHOOL, CLASSROOM, GYMNASIUM |
| CLASSROOM 1 | FIRST SCHOOL-HOUR |
| ⋮ | ⋮ |

| CONDITION INFORMATION | CONDITION ID |
|---|---|
| ID READ BY NFC READER IS TEACHER | TEACHER NFC READING |
| TEACHER'S ENTRANCE/EXIT GATE | TEACHER'S GATE |
| STUDENT'S ENTRANCE/EXIT GATE | STUDENT'S GATE |
| DOORWAY OF CLASSROOM | CLASSROOM |
| ⋮ | ⋮ |

CONTENT DISTRIBUTION METHOD, CONTENT DISTRIBUTION APPARATUS, AND STORAGE MEDIUM

CROSS-REFERENCE TO RELATED APPLICATION

This application is based upon and claims the benefit of priority of the prior Japanese Patent Application No. 2015-048106, filed on Mar. 11, 2015, the entire contents of which are incorporated herein by reference.

FIELD

The embodiments discussed herein are related to content distribution methods, content distribution apparatuses, and storage medium.

BACKGROUND

Conventionally, as a technique of restricting access to data recorded in a server by a simple operation without using a dedicated terminal, there has been a technique of restricting access to conference material data.

According to the technique, the server includes a recording unit that records conference material data, and a table in which at least information related to participants of the conference and security codes for control of the access to the conference material data of the conference are recorded in association with each other. In this technique, a security code writing device receives a security code transmitted from the server, and writes the received security code into a memory of the ID card owned by a conference participant. In this technique, a terminal reads the security code written into a memory of the ID card, and transmits the security code to the server to request access to the conference material data recorded in the server. Then, according to this technique, the server receives the security code transmitted from the terminal. If the security code is recorded in the table mentioned above, the server allows access to the recorded conference material data corresponding to the security code.

Related techniques are disclosed in, for example, Japanese Laid-open Patent Publication No. 2011-113371.

SUMMARY

According to an aspect of the invention, a content distribution method includes receiving, from a terminal, first information indicating an attribute of a user of the terminal, transmitting, to the terminal, second information relating to the attribute of the user of the terminal based on the first information, receiving, from the terminal, the second information and third information indicating a location of the terminal, and transmitting a content that is selected from among a plurality of contents based on the received second information and the received third information.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 3 is a diagram illustrating an example of a condition ticket table according to an embodiment;

FIG. 4 is a diagram illustrating an example of a condition ticket table according to an embodiment;

FIG. 5 is a schematic diagram illustrating a configuration example of ticket information according to an embodiment;

FIG. 12 is a diagram illustrating an example of a user terminal table according to the second and third embodiments;

FIG. 20 is a diagram illustrating an example of an affected condition information table according to the third embodiment;

FIG. 24 is a diagram illustrating an example of a condition ID table according to an embodiment.

DESCRIPTION OF EMBODIMENTS

However, the conventional technique mentioned above transmits the security code solely based on the owner's name of the ID card. Hence, the technique restricts accessible data by using the same security code even in different conditions such as in different places or different time periods. For this reason, the foregoing conventional technique is not capable of restricting accessible data on a condition-by-condition basis of users.

Meanwhile, in order to modify the conventional technique so as to restrict accessible data on the condition-by-condition basis, a server has to manage a security code for each of owners of ID cards and for each of conditions, and server's management load increases significantly.

This problem may occur not only in restriction of access to conference material data but also in restriction of access to data for teachers at an education site. This problem may also occur in restriction of access to data for shop managers of shops in a commercial facility such as a shopping center, and in restriction in any other condition.

An aspect of the disclosed technique is intended to reduce server's management load.

In one of conceivable techniques of reducing server's management load, a server transmits predetermined data to a user's terminal when the terminal becomes under a predefined condition, and deletes the predetermined data from the terminal when the terminal gets out of the predefined condition.

In this technique, data groups distributable are preregistered in the server on a condition-by-condition basis of a user of the terminal, the terminal determines whether any of the registered conditions is satisfied, and transmits the determination result to the server. In response to this, the server distributes the data group corresponding to the condition to the terminal if the condition is satisfied, and deletes the data group from the terminal if the condition is not satisfied. This embodiment is based on the assumption that the aforementioned data group includes various contents usable by the terminal, such as application, software, image data, voice data and text data. Thus, in the description below, the data group is referred to as a "content".

Figure 22:
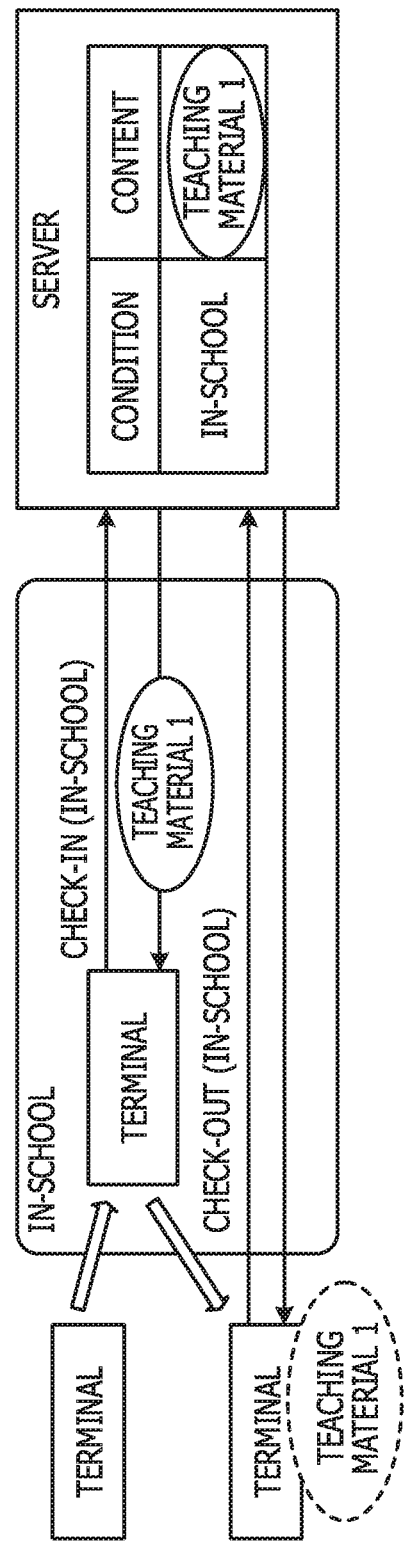
FIG. 22 is a schematic diagram illustrating an example of a processing flow of a conceivable technique.

FIG. 22 is a schematic diagram illustrating the technique applied to a system which distributes "teaching material 1" to a terminal when a condition "the terminal stays in the school" is satisfied. In this case, the server stores in advance information of "in-school" as the condition and information of "teaching material 1" in association with each other.

In this case, upon entering the school (hereinafter also may be referred to as "check-in"), the terminal transmits information indicating that the terminal has checked in the school to the server. In response to this, the server distributes "teaching material 1" which is the content corresponding to "in-school" to the terminal. Meanwhile, upon leaving the school (hereinafter, also may be referred to as "check-out"), the terminal transmits information indicating that the terminal has checked out from the school to the server. In response to this, the server deletes "teaching material 1" which is the content corresponding to "in-school" from the terminal.

The technique has no specific problem when the condition is of only one type. However, when the technique is applied to a case where multiple conditions may be satisfied at one time, it has a problem in that there is an increase of server's management load.

That is, in this case, the server has to predefine a large number of condition groups each combining multiple conditions, and store the condition groups and contents different for the respective condition groups in association with each other. In this case, the terminal has to determine whether all the conditions included in each of the condition groups are satisfied or not. Thus, load of the terminal also increases.

Figure 23:
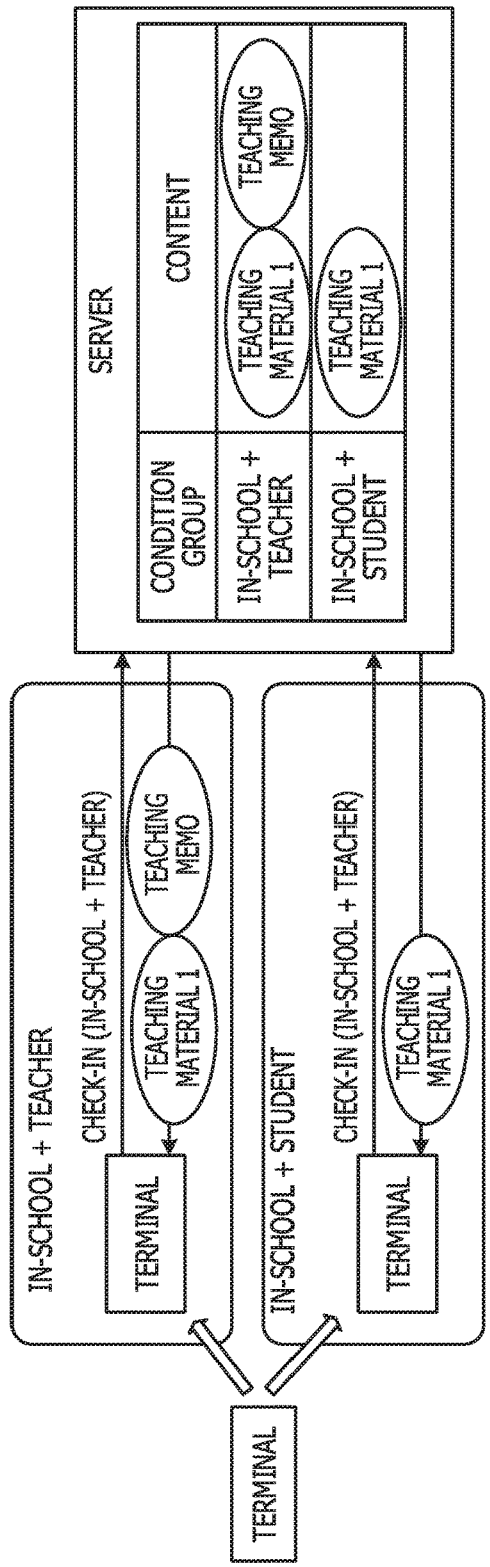
FIG. 23 is a schematic diagram illustrating problems with the conceivable technique.

For example, when there is a demand to change a content according to an entrance through which a user enters the school, the condition of "in-school" has to be divided into two condition groups of "in-school+teacher" and "in-school+student" as an example illustrated in FIG. 23. In this case, a teacher's content ("teaching material 1" and "teaching memo") and a student's content ("teaching material 1") have to be individually associated with the defined condition groups. Further, when distributing a content for a first grade student in the condition where "student" is "first grade", "in-school+student" has to be further divided to define condition groups of "in-school+student" and "in-school+first grade", and associate a corresponding content with each of the condition groups. Further, when there is a demand to distribute a content for a teacher's room to the teacher in response to a condition of "teacher's room", "in-school+teacher" has to be further divided to define condition groups of "in-school+teacher" and "teacher's room+teacher", and associate a corresponding content with each of the condition groups.

To address the above, in this embodiment, the server receives information indicating the condition of the terminal from the terminal, and sends the terminal ticket information corresponding to the condition indicated in the information received from the terminal. Then, in this embodiment, when the server receives the ticket information transmitted from the terminal, the server decides the content to be distributed according to the ticket information and distributes the decided content to the terminal. In particular, in this embodiment, information indicating the condition of the terminal includes user attribute information indicating the attribute of the user of the terminal and location information indicating the location where the terminal exists. Then, in this embodiment, when the server receives the ticket information transmitted from the terminal, the server decides the content to be distributed according to the combination of the user attribute information and the location information included in the ticket information.

Hereinafter, an example of the embodiment of the disclosed technique is described in detail with reference to the accompanying drawings.

First Embodiment

Figure 1:
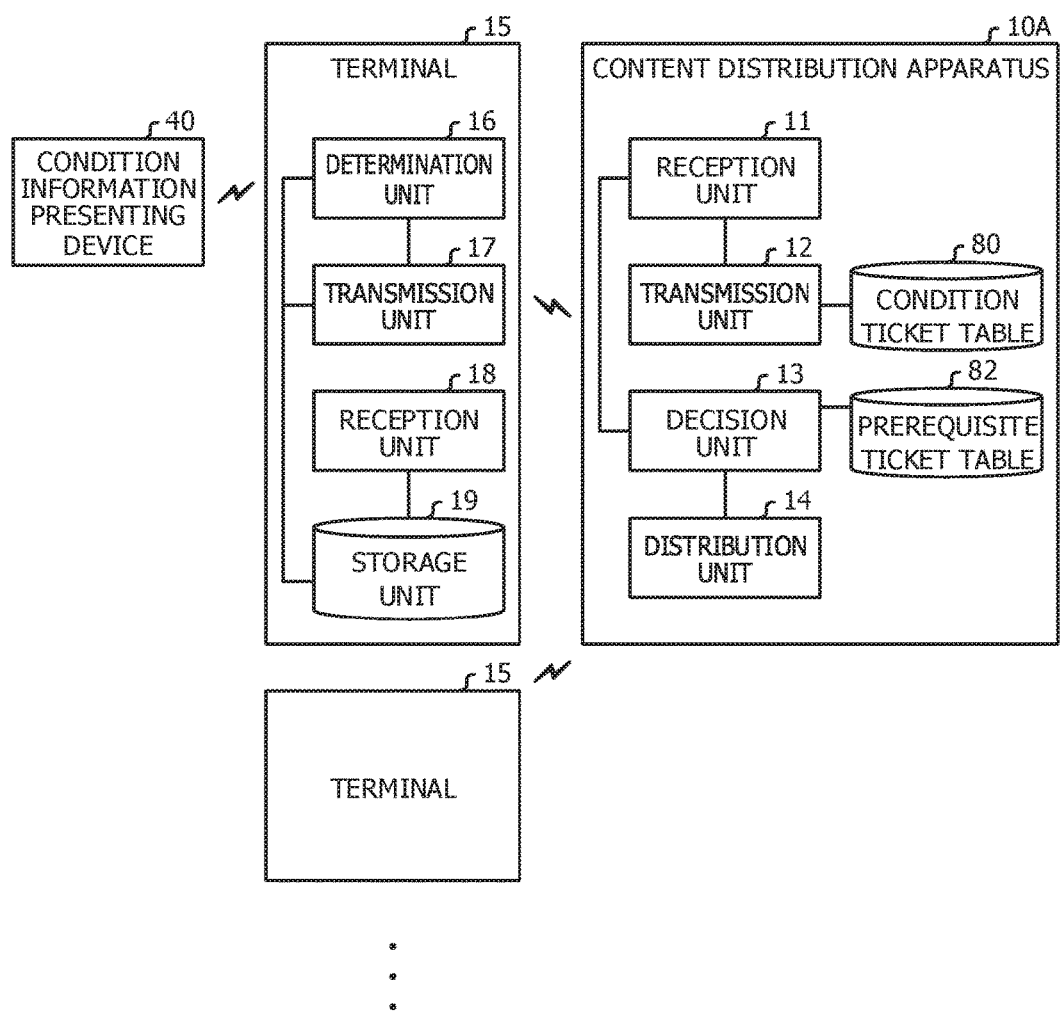
FIG. 1 is a functional block diagram of a content distribution apparatus and a terminal according to a first embodiment.

FIG. 1 illustrates a content distribution apparatus 10A and multiple terminals 15 according to this embodiment. As illustrated in FIG. 1, the content distribution apparatus 10A according to this embodiment includes a reception unit 11, a transmission unit 12, a decision unit 13 and a distribution unit 14.

The reception unit 11 is configured to receive information indicating a condition (hereinafter referred to as "condition information") of a terminal 15, which is described later, from the terminal 15. Although described in detail below, the terminal 15 according to this embodiment is configured to transmit user attribute information indicating the attribute of the user having the terminal to the content distribution apparatus 10A as the condition information as appropriate. The terminal 15 according to this embodiment is configured to also transmit location information indicating the location where the terminal exists to the content distribution apparatus 10A as the condition information as appropriate. Then, the reception unit 11 receives the condition information transmitted from the terminal 15 in real time. The user attribute information according to this embodiment is information indicating the user's role, but is not limited thereto. For example, other information may be applied as the user attribute information, provided that the information indicates the user's attribute such as user's name and user's belonging destination.

In this embodiment, the condition identification (ID) is applied as an example of the condition information. The condition ID according to this embodiment is text data indicating main content of the condition indicated by the condition information.

The transmission unit 12 is configured to transmit ticket information corresponding to the condition indicated by the condition ID received from the terminal 15 to the terminal 15. The content distribution apparatus 10A according to this embodiment stores a condition ticket table 80, described later, in which the condition ID, and an assigned ticket indicating ticket information assigned to the terminal 15 for a condition indicated by the condition ID are associated with each other. Then, the transmission unit 12 according to this embodiment acquires the ticket information corresponding to the condition ID received by the reception unit 11 with reference to the condition ticket table 80, and transmits to the terminal 15 of the transmission source of the condition ID.

The decision unit 13 is configured to decide the content to be distributed according to ticket information upon receiving the ticket information transmitted from the terminal 15.

That is, the terminal 15 according to this embodiment receives the ticket information transmitted by the transmission unit 12 and causes a storage unit 19 to store the ticket information. Then, the terminal 15 transmits the ticket information stored in the storage unit 19 to the content distribution apparatus 10A in a timing when the condition indicated by the condition ID changes. The content distribution apparatus 10A stores a prerequisite ticket table 82 described later, in which the condition ID, the content used in the condition indicated by the condition ID, and a prerequisite ticket indicating a type of ticket information prerequisite for use of the content are associated with each other. Then, the decision unit 13 according to this embodiment is configured to decide the content corresponding to the type of ticket information received from the terminal 15 as the content to be distributed to the terminal 15 of the transmission source of the ticket information with reference to the prerequisite ticket table 82. At that time, if ticket information received from the terminal 15 includes user attribute information and location information, the decision unit 13 determines the content to be distributed according to the combination of the information.

The distribution unit 14 is configured to distribute the content decided by the decision unit 13 to the terminal 15.

Meanwhile, each of the multiple terminals 15 according to this embodiment includes a determination unit 16, a transmission unit 17, and a reception unit 18.

The determination unit 16 is configured to determine the condition ID based on the condition information received from the condition information presenting device 40.

The condition information presenting device 40 according to this embodiment is provided at a site (hereinafter referred to as "passage site") where the user of the terminal 15 passes when entering or leaving a predetermined place for a certain purpose. Before passing any passage site, the user of the terminal 15 turns the terminal 15 into a state ready to communicate with the condition information presenting device 40. In response, the condition information presenting device 40 sends the terminal 15 location information which is information indicating the place corresponding to the passage site where the device is provided, or user attribute information corresponding to the user who may pass the passage site. The storage unit 19 stores a condition ID table in which the condition information and the condition ID corresponding to the condition information are associated with each other, the condition ID table illustrated in FIG. 24 by way of example. The determination unit 16 of the terminal 15 is configured to determine the condition ID based on the condition information received from the condition information presenting device 40 with reference to the storage unit 19.

The determination unit 16 of the terminal 15 is configured to generate enter/exit information indicating whether the purpose of the terminal 15 to pass through the passage site is for check-in a target place or check-out from the target place. The determination unit 16 according to this embodiment generates information indicating "check-in" as the enter/exit information when the terminal 15 has passed the passage site is at an odd number of times, and generates information indicating "check-out" as the enter/exit information when the terminal 15 has passed the passage site is at an even number of times.

The transmission unit 17 is configured to transmit the condition ID determined by the determination unit 16 and the enter/exit information generated by the determination unit 16 to the content distribution apparatus 10A. As described above, upon receiving the condition ID from the terminal 15, the content distribution apparatus 10A transmits the ticket information corresponding to the condition ID to the terminal 15.

Then, the reception unit 18 receives the ticket information transmitted by the content distribution apparatus 10A. Then, the reception unit 18 causes the storage unit 19 to store the received ticket information.

Meanwhile, when the condition ID determined by the determination unit 16 based on the condition information received from the condition information presenting device 40 is changed and when ticket information is stored in the storage unit 19, the transmission unit 17 transmits the ticket information together with the condition ID to the content distribution apparatus 10A. As described above, upon receiving the ticket information from the terminal 15, the content distribution apparatus 10A transmits the content corresponding to the ticket information to the terminal 15.

Then, the reception unit 18 receives the content transmitted by the content distribution apparatus 10A. Then, the reception unit 18 causes the storage unit 19 to store the received content. The content stored in the storage unit 19 is used by the terminal 15 according to the type of the content as appropriate.

In the content distribution apparatus 10A, the reception unit 11 is an example of the reception unit according to the disclosed technique, the transmission unit 12 is an example of the transmission unit according to the disclosed technique, the decision unit 13 is an example of the decision unit according to the disclosed technique, and the distribution unit 14 is an example of the distribution unit according to the disclosed technique. Hereinafter, an embodiment of the disclosed technique applied to the education site in the school (hereinafter referred to as "management target school") is described.

Figure 2:
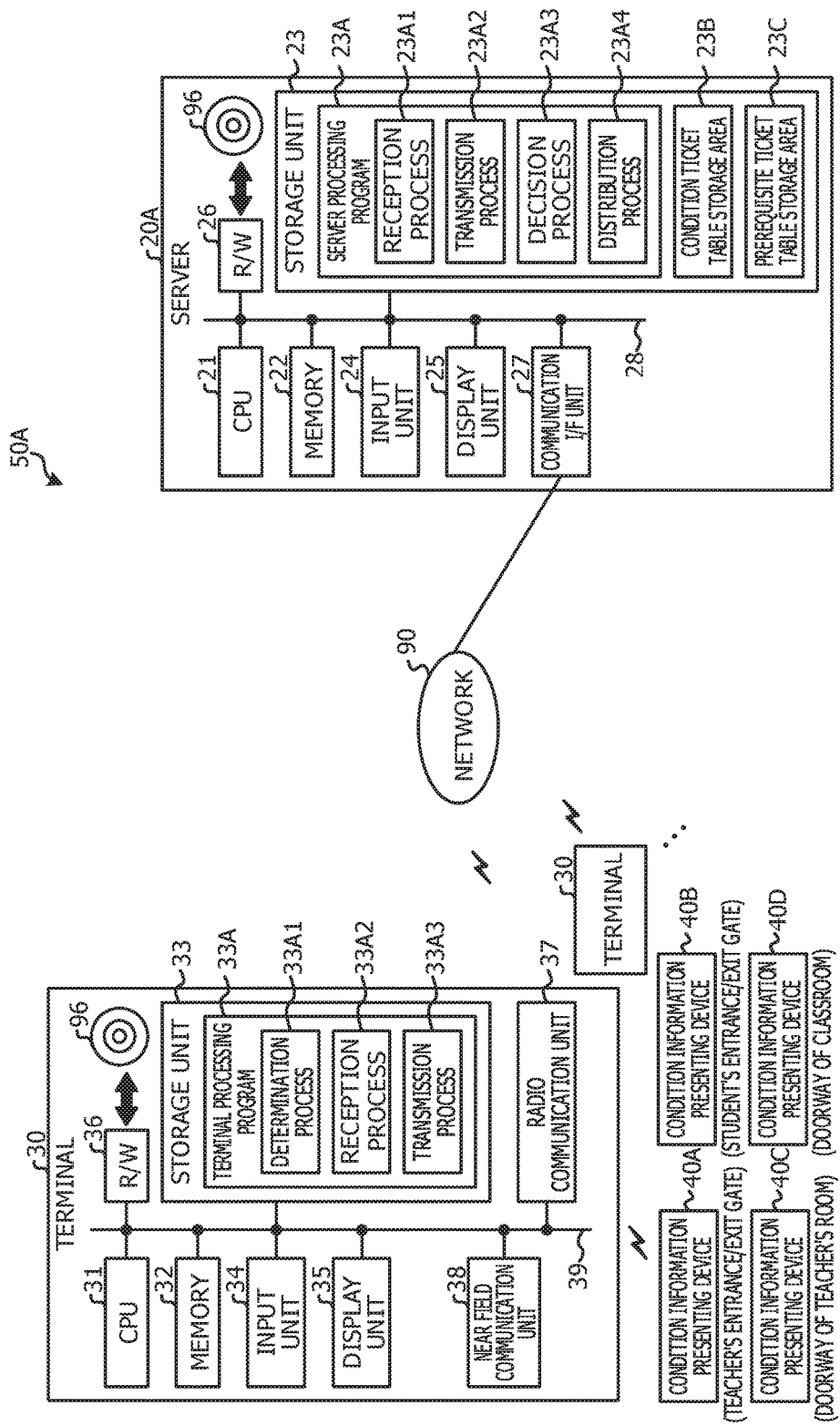
FIG. 2 is a block diagram illustrating a schematic configuration of a computer system according to the first embodiment.

The content distribution apparatus 10A, the terminals 15 and the condition information presenting device 40 described above may be implemented respectively by a server 20A, terminals 30, and multiple condition information presenting devices 40A to 40D (four devices in this embodiment), which are included in a computer system 50A illustrated in FIG. 2. The computer system 50A according to this embodiment includes the server 20A, the multiple terminals 30, and the multiple condition information presenting devices 40A to 40D, all of which are connected to a network 90 in a manner capable of mutual communications to each other. In the description below, when described without being distinguished from each other, the condition information presenting devices 40A to 40D are referred to as "condition information presenting device 40" with the last character A to D removed from the reference numerals.

The terminal 30 is a terminal distributed to teachers and students belonging to the management target school in advance and includes a central processing unit (CPU) 31, a memory 32, a storage unit 33, an input unit 34, a display unit 35, a medium read/write device (R/W) 36, a radio communication unit 37, and a near field communication unit 38. The CPU 31, the memory 32, the storage unit 33, the input unit 34, the display unit 35, the medium read/write device 36, the radio communication unit 37, and the near field communication unit 38 are connected to each other via a bus 39. The medium read/write device 36 is configured to read information written in a recording medium 96 and writes information into the recording medium 96.

The storage unit 33 may be implemented by a hard disk drive (HDD) or flush memory. The storage unit 33 stores a terminal processing program 33A for causing the terminal 30 to function as the terminal 15 illustrated in FIG. 1. The terminal processing program 33A is stored into the storage unit 33 when the recording medium 96 in which the terminal processing program 33A is written is set to the medium read/write device 36, and the medium read/write device 36 reads the terminal processing program 33A from the recording medium 96. The CPU 31 is configured to read the terminal processing program 33A from the storage unit 33, develop in the memory 32, and execute processing of the terminal processing program 33A sequentially.

The terminal processing program 33A includes a determination process 33A1, a transmission process 33A2, and a reception process 33A3. The CPU 31 operates as the determination unit 16 illustrated in FIG. 1 by executing the determination process 33A1. The CPU 31 operates as the transmission unit 17 illustrated in FIG. 1 by executing the transmission process 33A2. Further, the CPU 31 operates as the reception unit 18 illustrated in FIG. 1 by executing the reception process 33A3.

By executing the terminal processing program 33A as described above, the terminal 30 functions as the terminal 15 illustrated in FIG. 1.

The near field communication unit 38 according to this embodiment is configured to perform near field communication with the condition information presenting device 40 in accordance with a predetermined communication standard. As the communication standard, near field communication (NFC) is applied to the near field communication unit 38 according to this embodiment. Thus, when passing through the passage site, the user of the terminal 30 holds the terminal 30 over a predetermined communicative position of the condition information presenting device 40. The communication standard applied to the near field communication unit 38 is not limited to the NFC. For example, other communication standards such as, for example, Bluetooth (registered trade mark) and Infrared Data Association (IrDA) (registered trade mark) may be applied as the communication standard of the near field communication unit 38.

Meanwhile, the server 20A is a device configured to collectively save and manage various information used in the computer system 50A and is provided anywhere (by way of example, teacher's room in this embodiment) in the management target school. The server 20A includes a CPU 21, a memory 22, a storage unit 23, an input unit 24, a display unit 25, a medium read/write device 26, and a communication interface (I/F) unit 27. The CPU 21, the memory 22, the storage unit 23, the input unit 24, the display unit 25, the medium read/write device 26, and the communication I/F unit 27 are connected to each other via a bus 28. The medium read/write device 26 is configured to read information written into the recording medium 96 and writes information into the recording medium 96.

The storage unit 23 may be implemented by a hard disk drive (HDD) or flush memory. The storage unit 23 stores a server processing program 23A for causing the server 20A to function as the content distribution apparatus 10A.

The server processing program 23A is stored into the storage unit 23 when the recording medium 96 in which the server processing program 23A is written is set to the medium read/write device 26, and the medium read/write device 26 reads the server processing program 23A from the recording medium 96. The CPU 21 is configured to read the server processing program 23A from the storage unit 23, develop in the memory 22, and run processes of the server processing program 23A sequentially.

The server processing program 23A includes a reception process 23A1, a transmission process 23A2, a decision process 23A3, and a distribution process 23A4. The CPU 21 operates as the reception unit 11 illustrated in FIG. 1 by executing the reception process 23A1. The CPU 21 operates as the transmission unit 12 illustrated in FIG. 1 by executing the transmission process 23A2. The CPU 21 operates as the decision unit 13 illustrated in FIG. 1 by executing the decision process 23A3. Further, the CPU 21 operates as the distribution unit 14 illustrated in FIG. 1 by executing the distribution process 23A4.

By executing the server processing program 23A as described above, the server 20A functions as the content distribution apparatus 10A illustrated in FIG. 1. The server processing program 23A is an example of the content distribution program according to the disclosed technique.

The storage unit 23 is provided with a condition ticket table storage area 23B and a prerequisite ticket table storage area 23C. When the CPU 21 develops data stored in the condition ticket table storage area 23B into the memory 22, the condition ticket table 80 illustrated in FIG. 1 is generated. When the CPU 21 develops data stored in the prerequisite ticket table storage area 23C into the memory 22, the prerequisite ticket table 82 illustrated in FIG. 1 is generated.

As illustrated in FIG. 3, the condition ticket table 80 according to this embodiment includes the condition ID and the assigned ticket. As described above, the assigned ticket is information indicating ticket information assigned to the terminal 30 in the condition indicated by the corresponding condition ID.

The condition ticket table 80 illustrated in FIG. 3 indicates, for example, that an assigned ticket corresponding to the condition corresponding to the condition ID "teacher's gate" is the ticket information indicating "teacher". The condition ticket table 80 illustrated in FIG. 3 indicates, for example, that an assigned ticket corresponding to the condition corresponding to the condition ID "student's gate" is the ticket information indicating "student". The "teacher's gate" represents the condition where the terminal 30 has passed through a teacher's entrance/exit gate described later. Similarly, the "student's gate" represents the condition where the terminal 30 has passed a student's entrance/exit gate described later. Those conditions correspond to the user attribute information.

Meanwhile, as illustrated in FIG. 4, the prerequisite ticket table 82 according to this embodiment includes the condition ID, the content, and the prerequisite ticket. As described above, the content is information indicating a content used in the condition indicated by the corresponding condition ID, and includes various contents such as application, software, image data, voice data, and text data as described above. Further, as described above, the prerequisite ticket is information indicating the type of ticket information prerequisite for use of the corresponding content.

The prerequisite ticket table 82 of FIG. 4 indicates, for example, that the content which may be used in the condition corresponding to the condition ID "classroom" is two kinds of the content including "teaching memo 1" and "teaching material 1". The "classroom" represents the condition where the terminal 30 exists in the management target classroom described later and corresponds to the location information described above.

The prerequisite ticket table 82 of FIG. 4 indicates that among these contents ("teaching memo 1" and "teaching material 1"), the content which may be used in the terminal 30 assigned with information indicating "teacher" as the ticket information is "teaching memo 1". Further, the prerequisite ticket table 82 of FIG. 4 indicates that among these contents, "teaching material 1" may be used regardless of existence of the ticket information if the terminal 30 exists in the management target classroom described later. The prerequisite ticket table 82 of FIG. 4 indicates that the content which may be used in the condition corresponding to the condition ID "science laboratory" includes "chemical management table", and the content may be used by the terminal 30 assigned with two kinds of ticket information including "teacher" and "chemical administrator".

Meanwhile, FIG. 5 illustrates a specific example of ticket information 70 according to this embodiment. As illustrated in FIG. 5, ticket information 70 according to this embodiment includes five types of information including "ticket ID", "ticketSort", "ticketName", "expire", and "verification-URL".

"ticket ID" is an identifier of ticket information 70, and "ticketSort" is information indicating the content and meaning of ticket information 70 and corresponds to the "teacher" and the "student". "ticketName" is information indicating the name of ticket information 70, and "expire" is information indicating the expiration date of ticket information 70. In the ticket information 70 according to this embodiment, information indicating the period elapsed since a predetermined starting date is applied as the expiration date. Further, "verificationURL" is information indicating the Uniform Resource Identifier (URI) of the issuing source (in this embodiment, server 20A) of the ticket information 70.

Meanwhile, as illustrated in FIG. 2, among condition information presenting devices 40A to 40D according to this embodiment, the condition information presenting device 40A is provided at the teacher's entrance/exit gate in the management target school, and the condition information presenting device 40B is provided at the student's entrance/exit gate in the management target school. The condition information presenting device 40C is provided at the doorway of the teacher's room in the management target school, and the condition information presenting device 40D is provided at the doorway of the management target classroom described later.

The condition information presenting devices 40A to 40C transmit condition information indicating the user attribute information to the terminal 30 held over the communicative position. The condition information presenting devices 40D transmits condition information indicating the location information to the terminal 30 held over the communicative position. Specifically, the condition information presenting devices 40A and 40C transmit condition information indicating "teacher" to the terminal 30, and the condition information presenting device 40B transmits condition information indicating "student" to the terminal 30. The condition information presenting device 40D transmits condition information indicating "classroom" to the terminal 30. As described above, the terminal 30 according to this embodiment uses NFC as the communication standard of the near field communication unit 38. Therefore, it is needless to say that NFC is also adopted as the communication standard of the condition information presenting device 40.

In the computer system 50A according to this embodiment, a general-purpose tablet personal computer (PC) with a touch panel provided on a display surface of the display unit 35 is applied as the terminal 30. However, the terminal 30 is not limited thereto. The other computer such as, for example, a notebook-type PC may be applied as the terminal 30. Further, the terminal 30 is not limited to the PCs, and a smart phone may be applied as the terminal 30.

The server 20A according to this embodiment is installed in a predetermined room (teacher's room in this embodiment) of the management target school. However, the place of installation is not limited thereto. For example, the server 20A may be installed in the other room of the management target school or in a building different from the management target school.

Figure 6:
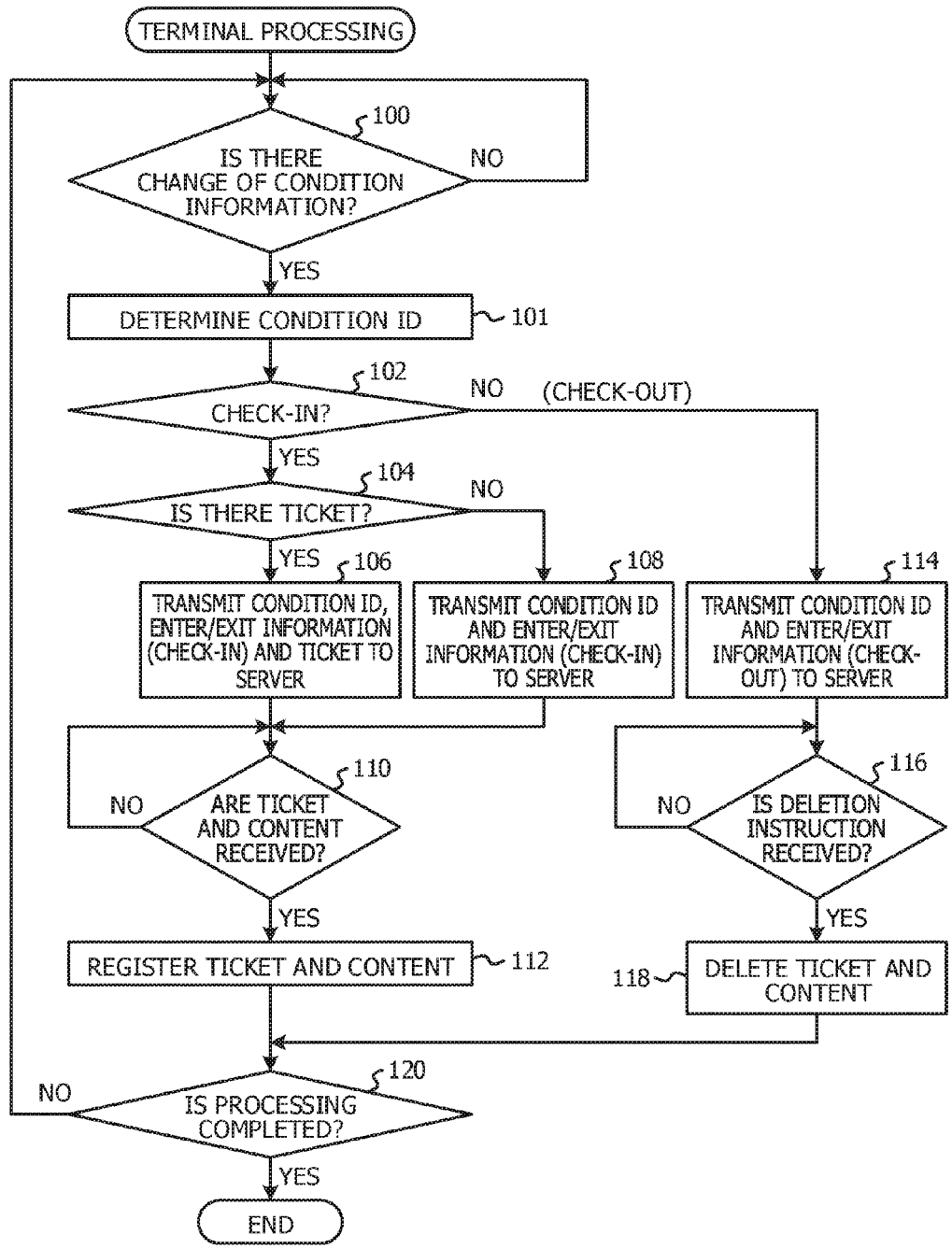
FIG. 6 is a flowchart illustrating an example of a terminal processing in accordance with an embodiment.

Next, action of this embodiment is described. In the description below, assume that the class is executed by the teacher and students belonging to the management target school in a predetermined classroom (hereinafter referred to as "management target classroom") in the management target school. When entering the management target school through a corresponding entrance/exit gate, the teacher and the student cause the terminal 30 owned thereby to execute the terminal processing program 33A. Then, terminal processing illustrated in FIG. 6 is performed.

In the step 100 of terminal processing, the determination unit 16 waits for reception of condition information from any condition information presenting device 40. The determination unit 16 determines whether there is a change in the received condition information from the last condition information. If the determination result is affirmative, the processing proceeds to the step 101. In the step 101, the determination unit 16 determines the condition ID from the received condition information. Then, the processing proceeds to the step 102. In the step 102, the determination unit 16 generates the enter/exit information, and determines whether the generated enter/exit information indicates check-in. If the determination result is affirmative, the processing proceeds to the step 104.

In the step 104, the transmission unit 17 determines whether ticket information 70 is stored in the memory 32 (storage unit 19). If the determination result is affirmative, the processing proceeds to the step 106. In the step 106, the transmission unit 17 transmits the determined condition ID, the generated enter/exit information and ticket information 70 stored in the memory 32 to the server 20A. Then, the processing proceeds to the step 110.

Meanwhile, if the determination result in the step 104 is negative, the processing proceeds to the step 108. Then, the transmission unit 17 transmits the determined condition ID and the generated enter/exit information to the server 20A. Then, the processing proceeds to the step 110.

Here, upon receiving the condition ID, enter/exit information and ticket information 70, or the condition ID and enter/exit information from any terminal 30, the server 20A according to this embodiment transmits the content and ticket information 70 based on the received information to the terminal 30 of the transmission source as described later.

Then, in the step 110, the reception unit 18 waits for reception of the content and ticket information 70 transmitted from the server 20A. If the determination result in the step 110 is affirmative, the processing proceeds to the step 112. In the step 112, the reception unit 18 stores the ticket information 70 and the content into the memory 32. After processing in the step 112 ends, the processing proceeds to the step 120.

Meanwhile, if the determination result in the step 102 is negative, the processing proceeds to the step 114. Then, the transmission unit 17 transmits the determined condition ID and the generated enter/exit information to the server 20A. Then, the processing proceeds to the step 116.

Upon receiving the enter/exit information indicating check-out from any terminal 30, the server 20A according to this embodiment transmits deletion instruction information for instructing deletion of the content and ticket information 70 based on the received information from the memory 32 to the terminal 30 of the transmission source as described later.

Then, in the step 116, the reception unit 18 waits for reception of the deletion instruction information transmitted from the server 20A. If the determination result in the step 116 is affirmative, the processing proceeds to the step 118. In the step 118, the reception unit 18 deletes the ticket information 70 and the content indicated by the received deletion instruction information from the memory 32. After processing in the step 118 ends, the processing proceeds to the step 120.

In the step 120, the reception unit 18 determines whether a predetermined timing for ending the terminal processing has arrived. If the determination result is negative, the processing returns to the step 100. If the determination result is affirmative, the terminal processing ends. In the terminal processing according to this embodiment, a timing of instruction input by the user instructing the end of the terminal processing is applied as the predetermined timing. However, it is needless to say that the timing is not limited thereto.

As described above, the content stored in the memory 32 in the terminal processing is used according to the type thereof as appropriate.

Figure 7:
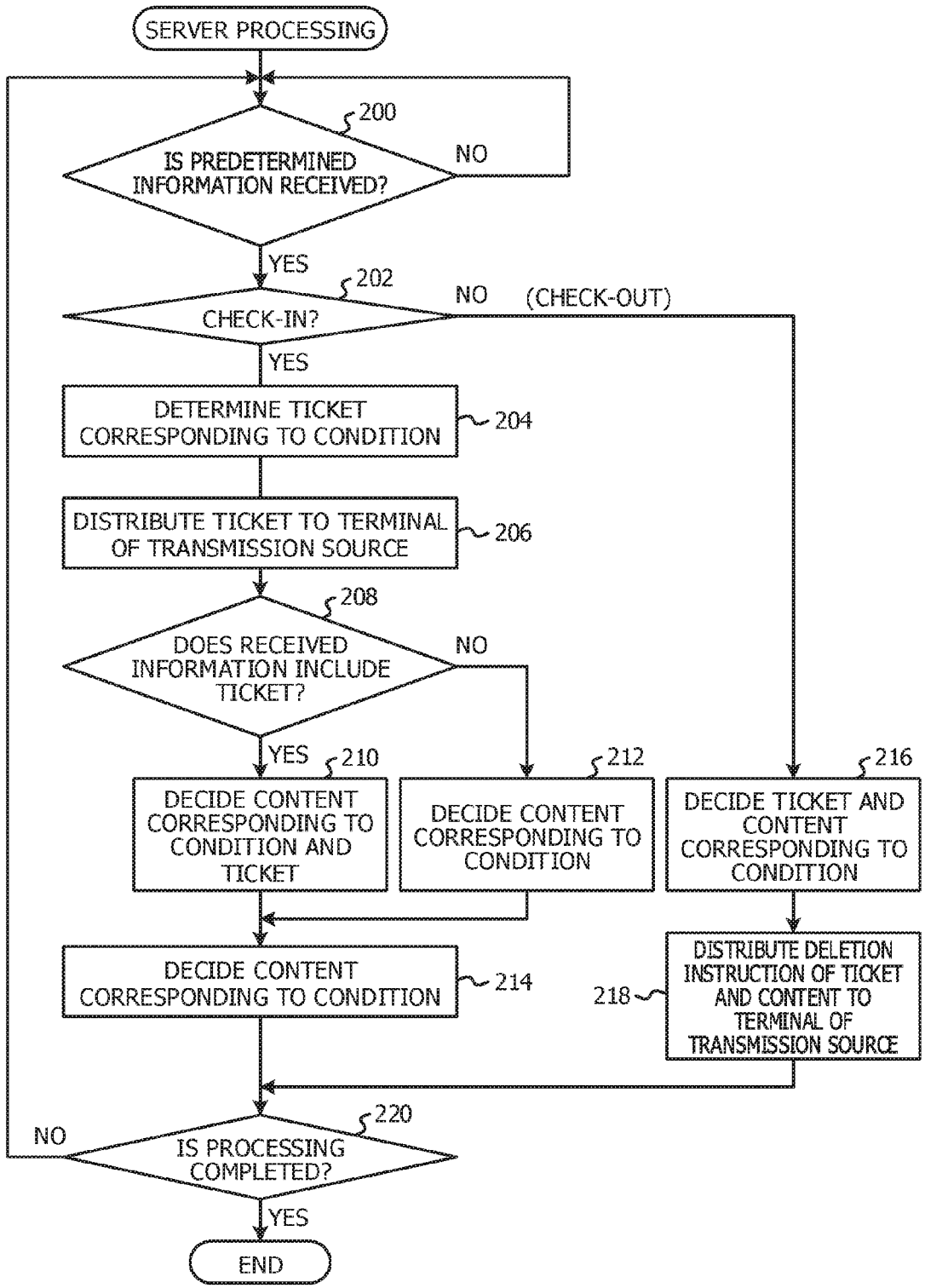
FIG. 7 is a flowchart illustrating an example of a server processing in accordance with the first and second embodiments.

Meanwhile, in the computer system 50A according to this embodiment, the server 20A executes the server processing program 23A to perform server processing illustrated in FIG. 7.

In the step 200 of server processing, the reception unit 11 waits for reception of the condition ID, enter/exit information and ticket information 70 or the condition ID and enter/exit information from any terminal 30. If the determination result in the step 200 is affirmative, the processing proceeds to the step 202. In the step 202, the transmission unit 12 determines whether the enter/exit information included in the received information indicates check-in. If the determination result is affirmative, the processing proceeds to the step 204.

In the step 204, the transmission unit 12 decides the ticket information 70 corresponding to the condition ID included in the received information with reference to the condition ticket table 80. In the next step 206, the transmission unit 12 transmits the decided ticket information 70 to the terminal 30 of the transmission source.

In the step 208, the decision unit 13 determines whether the information received from the terminal 30 includes the ticket information 70. If the determination result is affirmative, the processing proceeds to the step 210. In the step 210, the decision unit 13 decides the content corresponding to the ticket information 70 received from the terminal 30 and the received condition ID with reference to the prerequisite ticket table 82. Then, the processing proceeds to the step 214.

Meanwhile, when the determination result in the step 208 is negative, the processing proceeds to the step 212, and the decision unit 13 decides the content corresponding to the condition ID received from the terminal 30 with reference to the prerequisite ticket table 82. Then, the processing proceeds to the step 214.

In the step 214, the distribution unit 14 transmits the content decided in the processing of the step 210 or the step 212 to the terminal 30 of the transmission source. Then, the processing proceeds to the step 220.

Meanwhile, when the determination result in the step 202 is negative, the processing proceeds to the step 216, and the decision unit 13 decides the ticket information 70 of deletion target corresponding to the received condition ID with reference to the condition ticket table 80. Then, the decision unit 13 decides the content of deletion target corresponding to the received condition ID with reference to the prerequisite ticket table 82. Then, the processing proceeds to the step 218.

In the step 218, the decision unit 13 transmits the ticket information 70 of deletion target decided by processing in the step 216 and the deletion instruction information for instructing deletion of the content to the terminal 30 of the transmission source. Then, the processing proceeds to the step 220.

In the step 220, the distribution unit 14 determines whether a predetermined timing for ending the server processing has arrived. If the determination result is negative, the processing returns to the step 200. If the determination result is affirmative, then the server processing ends. In the server processing according to this embodiment, a timing of instruction input by the user instructing the end of the server processing is applied as the predetermined timing. However, it is needless to say that the timing is not limited thereto.

Figure 8:
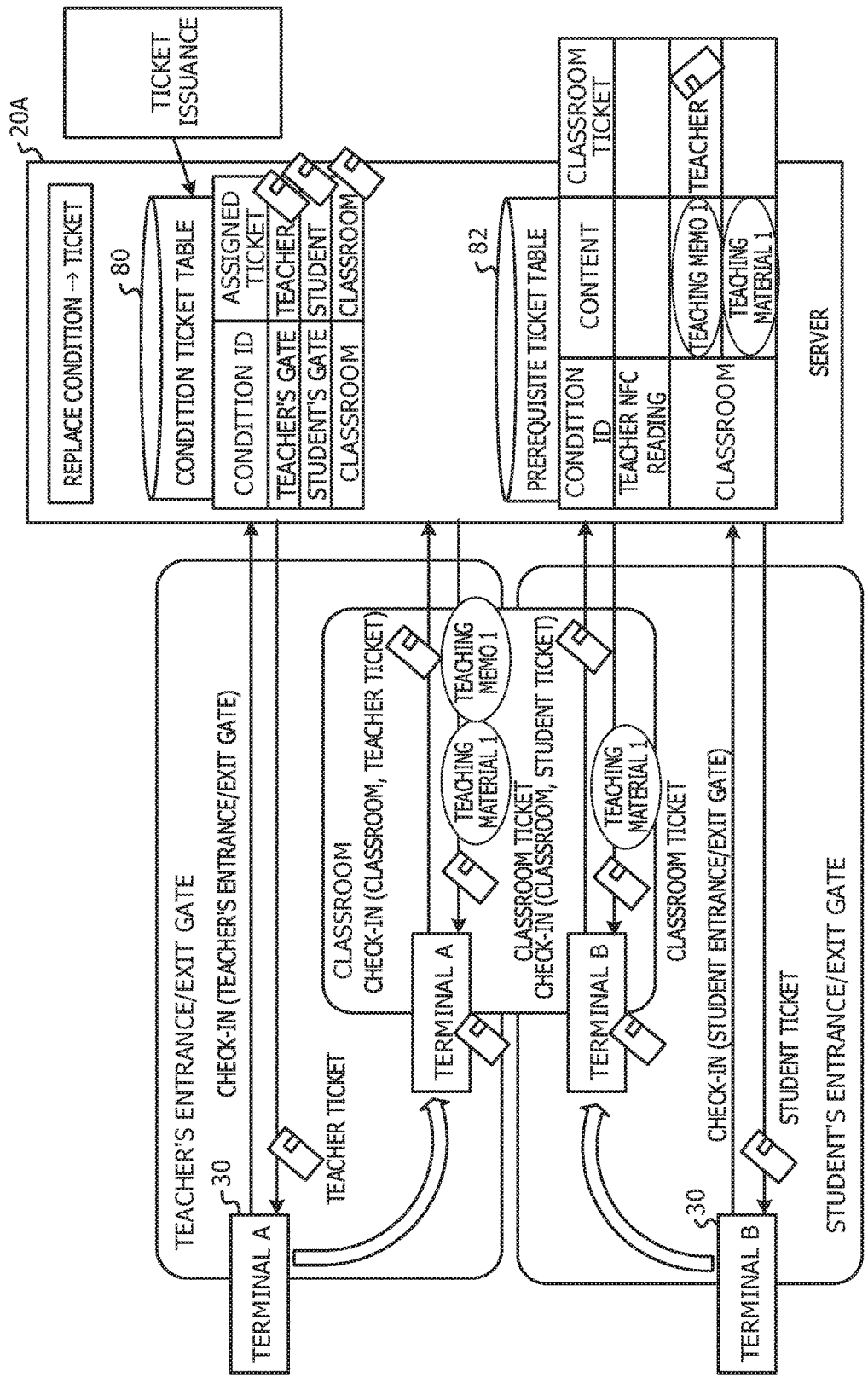
FIG. 8 is a schematic diagram illustrating an example of a processing flow of a computer system according to the first embodiment.

Next, the processing flow during execution of the terminal processing and server processing is described specifically with reference to FIG. 8.

Here, assume that the class is executed by the teacher and students belonging to the management target school as described above. In this case, the teacher holds the teacher's terminal 30 ("terminal A" illustrated in FIG. 8), enters through a teacher's entrance/exit gate of the management target school, enters the management target classroom through a doorway of the management target classroom, and executes a class. Then, after the class is over, the teacher leaves through the doorway of the management target classroom and leaves through a teacher's entrance/exit gate.

Meanwhile, the student holds the student's terminal 30 ("terminal B" illustrated in FIG. 8), enters through a student's entrance/exit gate of the management target school, enters the management target classroom through a doorway of the management target classroom, and receives a class. Then, after the class is over, the student leaves through the doorway of the management target classroom and leaves through a student's entrance/exit gate.

In this case, first of all, the teacher enters through the teacher's entrance/exit gate in the management target school while holding the teacher's terminal 30. When passing through the entrance/exit gate, the teacher holds the terminal 30 over the condition information presenting device 40A. In response, the condition information presenting device 40A transmits condition information indicating "teacher" to the terminal 30. In response to the condition information, the terminal 30 generates enter/exit information indicating check-in and transmits to the server 20A together with the determined condition ID.

Meanwhile, the student enters through the student's entrance/exit gate in the management target school while holding the student's terminal 30. When passing through the entrance/exit gate, the student holds the terminal 30 over the condition information presenting device 40B. In response, the condition information presenting device 40B transmits condition information indicating "student" to the terminal 30. In response to the condition information, the terminal 30 generates enter/exit information indicating check-in and transmits to the server 20A together with the determined condition ID.

Meanwhile, upon receiving enter/exit information indicating the condition ID and check-in from any terminal, the server 20A decides the ticket information 70 corresponding to the condition ID with reference to the condition ticket table 80. At that time, ticket information 70 indicating "teacher" is decided as the ticket information 70 corresponding to the condition ID received from the teacher's terminal 30, and ticket information 70 indicating "student" is decided as the ticket information 70 corresponding to the condition ID received from the student's terminal 30. Then, the server 20A transmits the decided ticket information 70 to the terminal 30 of the transmission source. Upon receiving ticket information 70 from the server 20A, the teacher's terminal 30 and the student's terminal 30 store the ticket information 70 into the memory 32.

The server 20A decides the content corresponding to the received condition ID with reference to the prerequisite ticket table 82. At that time, the content corresponding to the condition ID received from the teacher's terminal 30 and the student's terminal 30 do not exist and therefore is not decided. Therefore, the server 20A does not send the content to the terminal 30 at this time.

Thereafter, the teacher enters the management target classroom through the doorway while holding the teacher's terminal 30. When passing the doorway, the teacher holds the terminal 30 over the condition information presenting device 40D. In response, the condition information presenting device 40D transmits condition information indicating "classroom" to the terminal 30. In response to the condition information, the terminal 30 generates enter/exit information indicating check-in and transmits to the server 20A together with the determined condition ID. Since the ticket information 70 indicating "teacher" is stored in the memory 32 at this point, the terminal 30 transmits the ticket information 70 to the server 20A.

Meanwhile, the student enters the management target classroom through the doorway while holding the student's terminal 30. When passing the doorway, the student also holds the terminal 30 over the condition information presenting device 40D. In response, the condition information presenting device 40D transmits condition information indicating "classroom" to the terminal 30. In response to the condition information, the terminal 30 generates enter/exit information indicating check-in and transmits to the server 20A together with the determined condition ID. Since ticket information 70 indicating "student" is stored in the memory 32 at this point, the terminal 30 transmits the ticket information 70 to the server 20A.

Meanwhile, upon receiving enter/exit information indicating the condition ID and check-in from any terminal, the server 20A decides the ticket information 70 corresponding to the condition ID with reference to the condition ticket table 80. At this point, ticket information 70 indicating "classroom" is decided as the ticket information 70 corresponding to the condition ID received from each of the teacher's terminal 30 and the student's terminal 30.

The server 20A decides the content corresponding to the received information with reference to the prerequisite ticket table 82.

At this point, since the server 20A has already received the condition ID indicating "classroom" and ticket information 70 indicating "teacher", "teaching memo 1" being the content corresponding to "classroom" and "teacher" is decided as the content which is to be distributed to the teacher's terminal 30. In this case, the condition ID is information indicating "classroom". Thus, "teaching material 1" being the content corresponding only to "classroom" is also decided as the content which is to be distributed to the teacher's terminal 30.

Meanwhile, the server 20A has received the condition ID indicating "classroom" and ticket information 70 indicating "student". However, the content corresponding to "student" does not exist. Thus, only "teaching material 1" being the content corresponding only to "classroom" is decided as the content which is to be distributed to the student's terminal 30.

Then, the server 20A transmits the decided ticket information 70 and the decided content to the terminal 30 of the transmission source. Then, the terminal 30 stores the received ticket information 70 and content into the memory 32.

Meanwhile, after the class is over, the teacher leaves out the management target classroom through the doorway while holding the teacher's terminal 30. When passing the doorway, the teacher holds the terminal 30 over the condition information presenting device 40D. In response, the condition information presenting device 40D transmits condition information indicating "classroom" to the terminal 30. In response to the condition information, the terminal 30 generates enter/exit information indicating check-out and transmits to the server 20A together with the determined condition ID.

Meanwhile, after the class is over, the student also leaves out the management target classroom through the doorway while holding the student's terminal 30. When passing the doorway, the student also holds the terminal 30 over the condition information presenting device 40D. In response, the condition information presenting device 40D transmits condition information indicating "classroom" to the terminal 30. In response to the condition information, the terminal 30 generates enter/exit information indicating check-out and transmits to the server 20A together with the determined condition ID.

Upon receiving the enter/exit information indicating check-out from any terminal 30, the server 20A decides the ticket information 70 and content to be deleted according to the condition ID received together with the enter/exit information with reference to the condition ticket table 80 and the prerequisite ticket table 82. Then, the server 20A transmits, to the terminal 30 of the transmission source, the deletion instruction information of instructing deletion of the decided ticket information 70 (ticket information 70 indicating "classroom") and the content (for example, "teaching memo 1" and "teaching material 1" for the teacher's terminal 30). Then, the terminal 30 deletes the ticket information 70 and content corresponding to the received deletion instruction information from the memory 32.

Thereafter, when leaving the management target school through the teacher's entrance/exit gate while holding the teacher's terminal 30, the teacher holds the terminal 30 over the condition information presenting device 40A. In response, the condition information presenting device 40A transmits condition information indicating "teacher" to the terminal 30. In response to the condition information, the terminal 30 generates enter/exit information indicating check-out and transmits to the server 20A together with the determined condition ID.

Meanwhile, when leaving the management target school through the student's entrance/exit gate while holding the student's terminal 30, the student holds the terminal 30 over the condition information presenting device 40B. In response, the condition information presenting device 40B transmits condition information indicating "student" to the terminal 30. In response to the condition information, the terminal 30 generates enter/exit information indicating check-out and transmits to the server 20A together with the determined condition ID.

Upon receiving the enter/exit information indicating check-out from any terminal 30, the server 20A decides the ticket information 70 and content to be deleted according to the condition ID received together with the enter/exit information with reference to the condition ticket table 80 and the prerequisite ticket table 82. Then, the server 20A transmits the deletion instruction information of instructing deletion of the decided ticket information 70 and content to the terminal 30 of the transmission source. At that time the content corresponding to the condition ID does not exist. Thus, deletion of the content is not instructed in the transmitted deletion instruction information. Upon receiving the deletion instruction information, the terminal 30 deletes the ticket information 70 corresponding to the received deletion instruction information from the memory 32.

Figure 9:
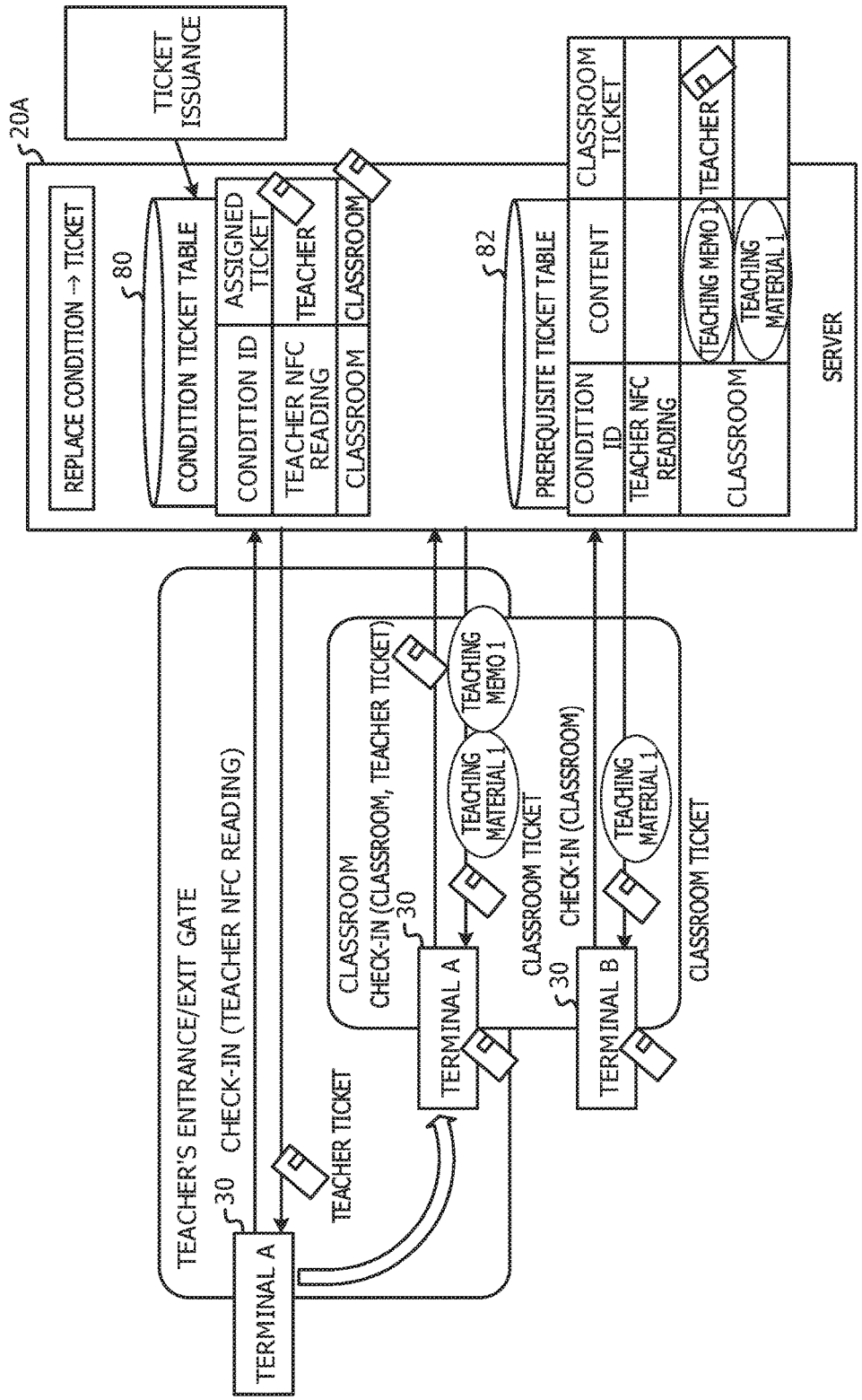
FIG. 9 is a schematic diagram illustrating another example of the processing flow of the computer system according to the first embodiment.

Next, another example of each of processing flows during execution of the terminal processing and server processing is described specifically with reference to FIG. 9. Here, the processing flows for holding the terminal 30 over the condition information presenting device 40C provided at the doorway of the teacher's room when entering the teacher's room before execution of the class, and when leaving the teacher's room after the class is over are described. Here, the processing flows for holding terminal 30 over the condition information presenting device 40D provided at the doorway of the management target classroom when the teacher and the student enter the management target classroom and when the teacher and the student leave the management target room are described.

In this case, first of all, the teacher enters the teacher's room through the doorway thereof in the management target school while holding the teacher's terminal 30 ("terminal A" illustrated in FIG. 9). When entering the teacher's room, the teacher holds the terminal 30 over the condition information presenting device 40C. In response, the condition information presenting device 40C transmits condition information indicating "teacher" to the terminal 30. In response to the condition information, the terminal 30 generates enter/exit information indicating check-in and transmits to the server 20A together with the determined condition ID.

Meanwhile, upon receiving enter/exit information indicating the condition ID and check-in from the teacher's terminal 30, the server 20A decides the ticket information 70 corresponding to the condition ID with reference to the condition ticket table 80. At this point, ticket information 70 indicating "teacher" is decided as the ticket information 70 corresponding to the condition ID received from the teacher's terminal 30. Then, the server 20A transmits the decided ticket information 70 to the terminal 30 of the transmission source. Upon receiving ticket information 70 from the server 20A, the teacher's terminal 30 stores the ticket information 70 into the memory 32.

Then, the server 20A decides the content corresponding to the received condition ID with reference to the prerequisite ticket table 82. At that time, the content corresponding to the condition ID received from the teacher's terminal 30 does not exist and therefore is not decided. Therefore, the server 20A does not send the content to the terminal 30 at this time. When leaving the teacher's room, the teacher does not hold the terminal 30 over the condition information presenting device 40C.

Thereafter, the teacher and the student enter and leave the management target classroom. Description of processing flows thereof is omitted as being the same as the processing described with reference to FIG. 8.

After the class is over, the teacher leaves the management target classroom and enters the teacher's room while holding the teacher's terminal 30. When entering the teacher's room, the teacher does not hold the terminal 30 over the condition information presenting device 40C. Then, when leaving the teacher's room, the teacher holds the terminal 30 over the condition information presenting device 40C. In response, the condition information presenting device 40C transmits condition information indicating "teacher" to the terminal 30. In response to the condition information, the terminal 30 generates enter/exit information indicating check-out and transmits to the server 20A together with the determined condition ID.

Meanwhile, upon receiving the enter/exit information indicating check-out from the terminal 30, the server 20A decides the ticket information 70 and content to be deleted according to the condition ID received together with the enter/exit information with reference to the condition ticket table 80 and the prerequisite ticket table 82. Then, the server 20A transmits the deletion instruction information of instructing deletion of the decided ticket information and content to the terminal 30 of the transmission source. At that time the content corresponding to the condition ID does not exist. Thus, deletion of the content is not instructed in the transmitted deletion instruction information. Upon receiving the deletion instruction information, the terminal 30 deletes the ticket information 70 corresponding to the received deletion instruction information from the memory 32.

As described in detail above, the server according to this embodiment receives information indicating the condition of the terminal 30 from the terminal 30, and transmits the ticket information 70 corresponding to the condition indicated in the information received from the terminal 30, to the terminal 30. Then, in this embodiment, when the server receives the ticket information 70 transmitted from the terminal 30, the server decides the content to be distributed according to the ticket information 70 and distributes the determined content to the terminal 30. Thus, server's management load may be reduced as compared with a conventional technique that manages the security code in the server for each of ID card owners and for each of conditions.

In this embodiment, information indicating user attribute information and location information is applied as information indicating the condition of the terminal 30. Thus, an appropriate content may be distributed to the terminal 30 according to the combination of the user attribute information and the location information.

In this embodiment, information indicating the user's role is applied as the user attribute information. Thus, an appropriate content may be distributed to the terminal 30 according to the user's role.

In this embodiment, a tablet PC is applied as the terminal 30. Compared with a case where a notebook-type PC comprising a keyboard is applied as the terminal 30, the tablet PC reduces load to the user when holding the terminal 30.

Further, in this embodiment, various information mentioned above is transmitted and received by wireless transmission. This further improves convenience for a user.

Second Embodiment

Next, a second embodiment of the disclosed technique is described. Throughout drawings, the same portion as in the first embodiment is assigned with the same reference numeral, and description thereof is omitted to the most.

Figure 10:
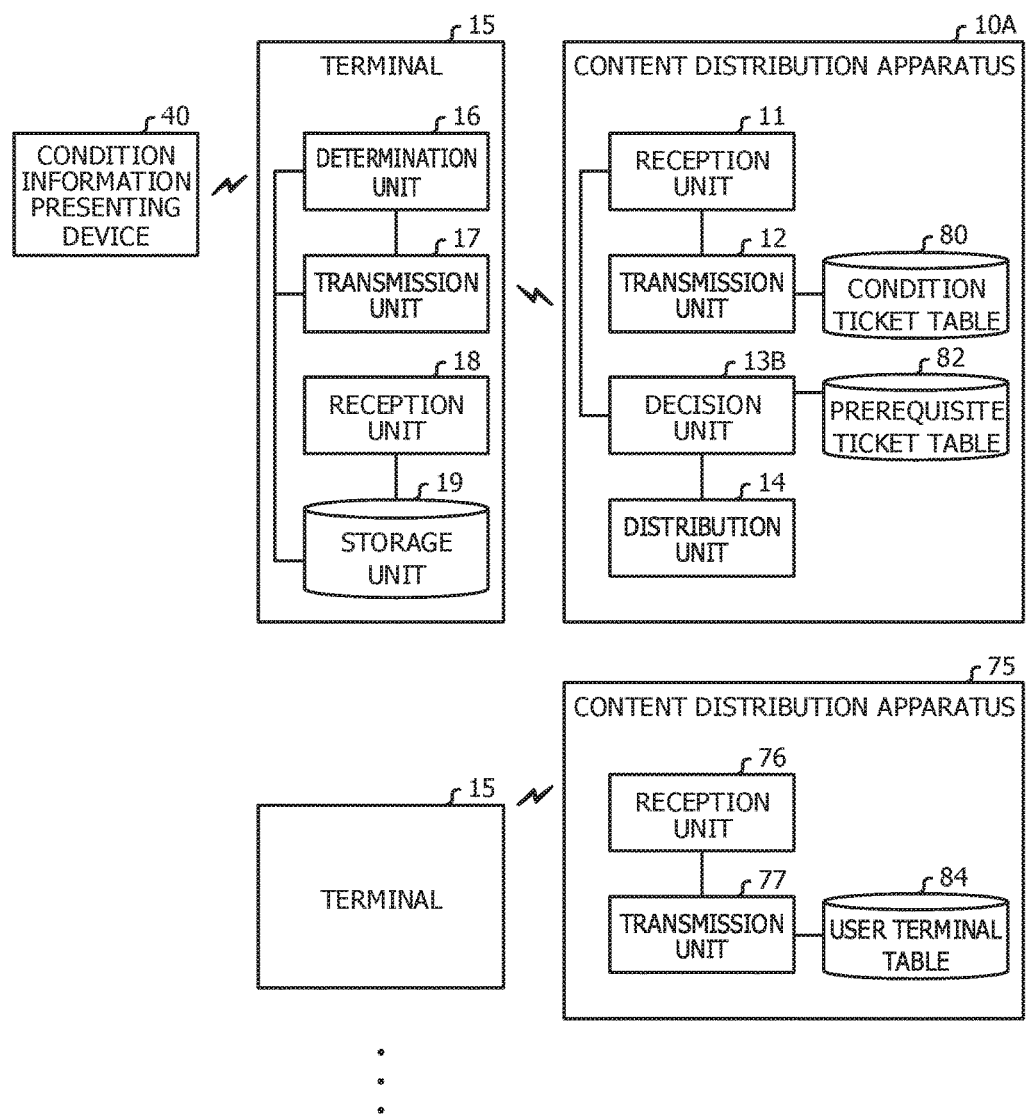
FIG. 10 is a functional block diagram of a content distribution apparatus, a terminal, and a ticket operation device according to the second embodiment.

FIG. 10 illustrates an entire configuration of a system according to the second embodiment. As illustrated in FIG. 10, the system according to the second embodiment is different from the system according to the first embodiment (see FIG. 1) in that a ticket operation device 75 is newly added.

Upon entering a predetermined place, a terminal 15 according to the second embodiment is provided with a new function in such a way that a new application software is distributed from a server 20A and installed thereon as the content. In the terminal 15 according to the second embodiment, the application software is deleted (uninstalled) by the server 20A when leaving the predetermined place.

In the second embodiment, a program for assigning new ticket information 70 and deleting already assigned ticket information 70 is distributed as the application software from a specific terminal 15 to another terminal 15. Thus, the system according to the second embodiment is newly provided with a ticket operation device 75 configured to collectively manage assignment and deletion of the ticket information 70 from a specific terminal 15 to another terminal 15.

As illustrated in FIG. 10, the ticket operation device 75 according to the second embodiment includes a reception unit 76 and a transmission unit 77.

The reception unit 76 is configured to receive, from a specific terminal 15, a command including the type of ticket information to be assigned or deleted, assignment/deletion information indicating whether the ticket information is assigned or deleted, and identification information for identifying the owner of the terminal 15 which the ticket information is assigned to or deleted from. Hereinafter, the command is referred to as "assignment/deletion designation command".

The transmission unit 77 is configured to, when newly assigning the ticket information 70, transmit the ticket information 70 to a terminal 15 identified by the identification information based on the assignment/deletion designation command received by the reception unit 76. The transmission unit 77 is configured to, when deleting the already assigned ticket information 70, transmit the deletion instruction information of instructing deletion of the designated ticket information 70 to a terminal 15 identified by the identification information.

The ticket operation device 75 according to this embodiment stores a user terminal table 84 described later, in which identification information for identifying the owner of each of terminals 15 and terminal information used for communication between terminals 15 corresponding to the identification information are associated with each other. Then, the transmission unit 77 according to this embodiment acquires terminal information of the terminal 15 corresponding to the identification information received by the reception unit 76 with reference to the user terminal table 84, and transmits the ticket information 70 or the deletion instruction information to the terminal 15 corresponding to the terminal information. In this embodiment, the address in the network 90 of a corresponding terminal 15 is used as the terminal information. However, it is needless to say that the terminal information is not limited thereto.

Upon receiving the ticket information 70 or the deletion instruction information from the ticket operation device 75, the terminal 15 registers the ticket information 70 when information received from the ticket operation device 75 is the ticket information 70. When the information received from the ticket operation device 75 is the deletion instruction information, the terminal 15 deletes the corresponding ticket information 70.

Figure 11:
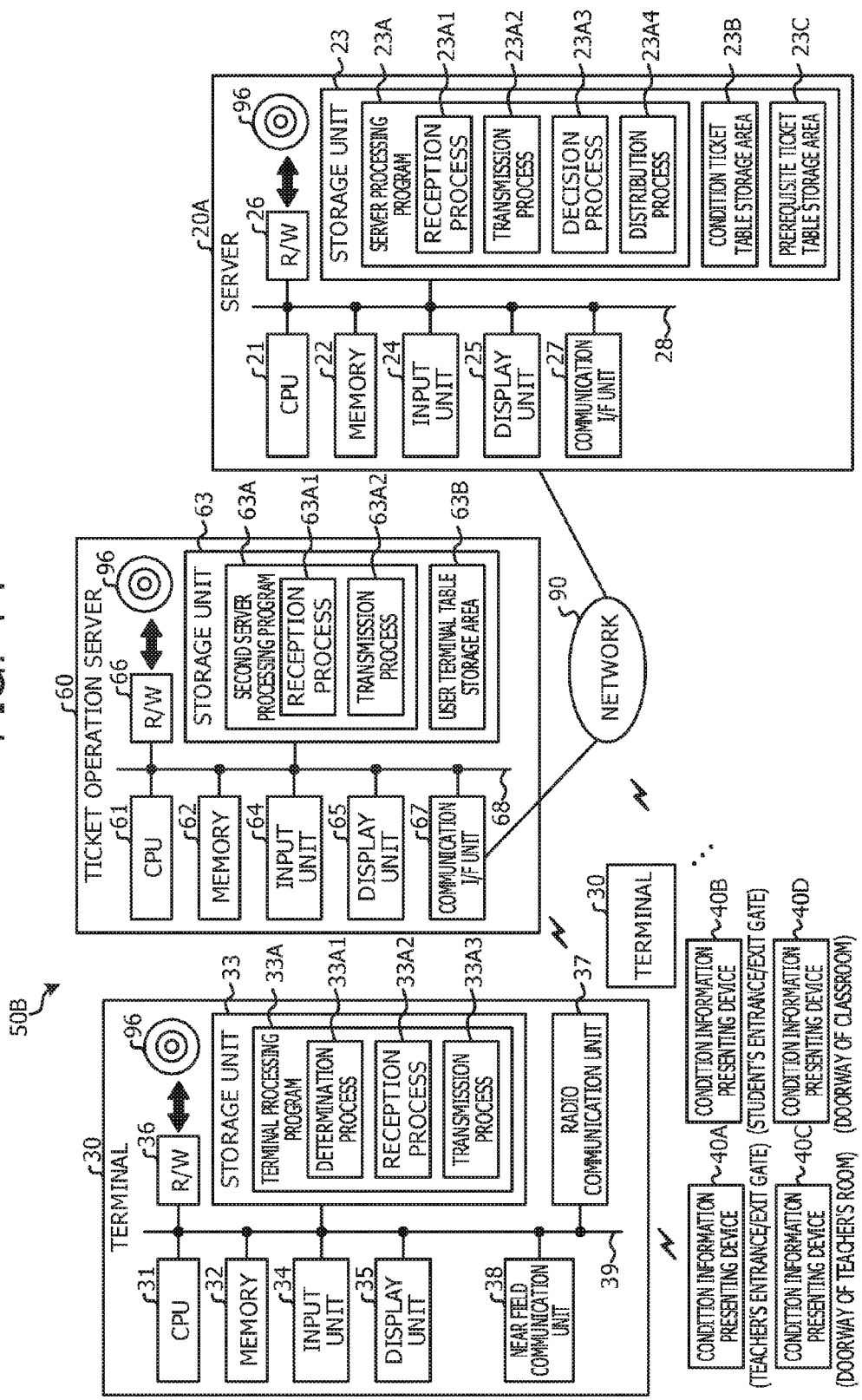
FIG. 11 is a block diagram illustrating a schematic configuration of a computer system according to the second embodiment.

The system according to the second embodiment may be implemented by a server 20A, terminals 30, multiple condition information presenting devices 40A to 40D (four devices in this embodiment), and a ticket operation server 60, which are included in a computer system 50B illustrated in FIG. 11.

As illustrated in FIG. 11, the computer system 50B according to the second embodiment is different from the computer system 50A according to the first embodiment in that the computer system 50B newly includes the ticket operation server 60 capable of accessing the network 90.

The ticket operation server 60 according to the second embodiment is provided, for example, at a place (in this embodiment, teacher's room similarly with the server 20A) of the management target school. However, the place is not limited thereto. Similarly with the server 20A, the ticket operation server 60 may be installed, for example, in another room of the management target school or in a building different from the management target school.

As illustrated in FIG. 11, the ticket operation server 60 includes a CPU 61, a memory 62, a storage unit 63, an input unit 64, a display unit 65, a medium read/write device 66, and a communication I/F unit 67. The CPU 61, the memory 62, the storage unit 63, the input unit 64, the display unit 65, the medium read/write device 66, and the communication I/F unit 67 are connected to each other via a bus 68. The medium read/write device 66 is configured to read information written into the recording medium 96 and writes information into the recording medium 96.

The storage unit 63 may be implemented by a hard disk drive (HDD) or flush memory. The storage unit 63 stores a second server processing program 63A for causing the ticket operation server 60 to function as the ticket operation device 75.

The second server processing program 63A is stored into the storage unit 63 when the recording medium 96 in which the second server processing program 63A is written is set to the medium read/write device 66, and the medium read/write device 66 reads the second server processing program 63A from the recording medium 96. The CPU 61 is configured to read the second server processing program 63A from the storage unit 63, develop in the memory 62, and run processes of the second server processing program 63A sequentially.

The second server processing program 63A includes a reception process 63A1 and a transmission process 63A2. The CPU 61 operates as the reception unit 76 illustrated in FIG. 10 by executing the reception process 63A1. The CPU 61 operates as the transmission unit 77 illustrated in FIG. 10 by executing the transmission process 63A2.

By executing the second server processing program 63A as described above, the ticket operation server 60 functions as the ticket operation device 75 illustrated in FIG. 10.

The storage unit 63 is provided with a user terminal table storage area 63B. When the CPU 61 develops data stored in the user terminal table storage area 63B into the memory 62, the user terminal table 84 is generated.

As illustrated in FIG. 12, the user terminal table 84 according to this embodiment includes the identification information and the terminal information. The user terminal table 84 illustrated in FIG. 12 indicates that terminal information corresponding to a terminal 30 assigned with "teacher" as the identification information is "T010", and terminal information corresponding to a terminal 30 assigned with "student A" as the identification information is "T020". The terminal 30 assigned with the identification information of the "teacher" is a teacher's terminal 30, and the terminal 30 assigned with the identification information of the "student A" is a terminal 30 of a predetermined student A.

Next, action of the second embodiment is described. Here, the server 20A installs a specific terminal processing program on the teacher's terminal 30 and a designated terminal processing program on the student's terminal 30 in response to entry of the teacher's terminal 30 and the student's terminal 30 into a predetermined place (in this case, "classroom").

Figure 13:
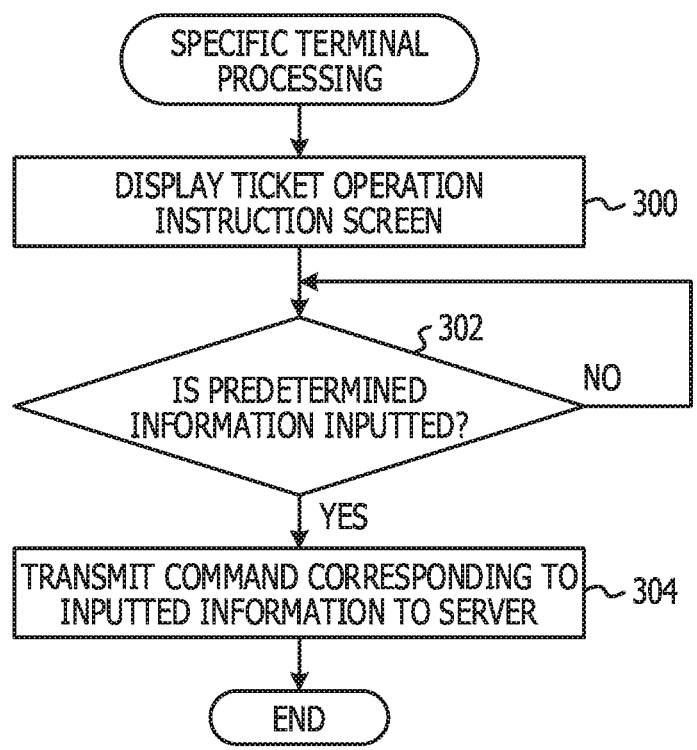
FIG. 13 is a flowchart illustrating an example of a specific terminal processing according to the second and third embodiments.

In this case, when the teacher assigns the ticket information 70 to a specific student's terminal 30 or deletes already registered ticket information 70 from the terminal 30, the specific terminal processing illustrated in FIG. 13 is performed by executing the specific terminal processing program.

In the step 300 of specific terminal processing, the transmission unit 17 controls the display unit 35 so as to display a predetermined ticket operation instruction screen, and in the next step 302, the transmission unit 17 waits for input of predetermined information.

Figure 14:
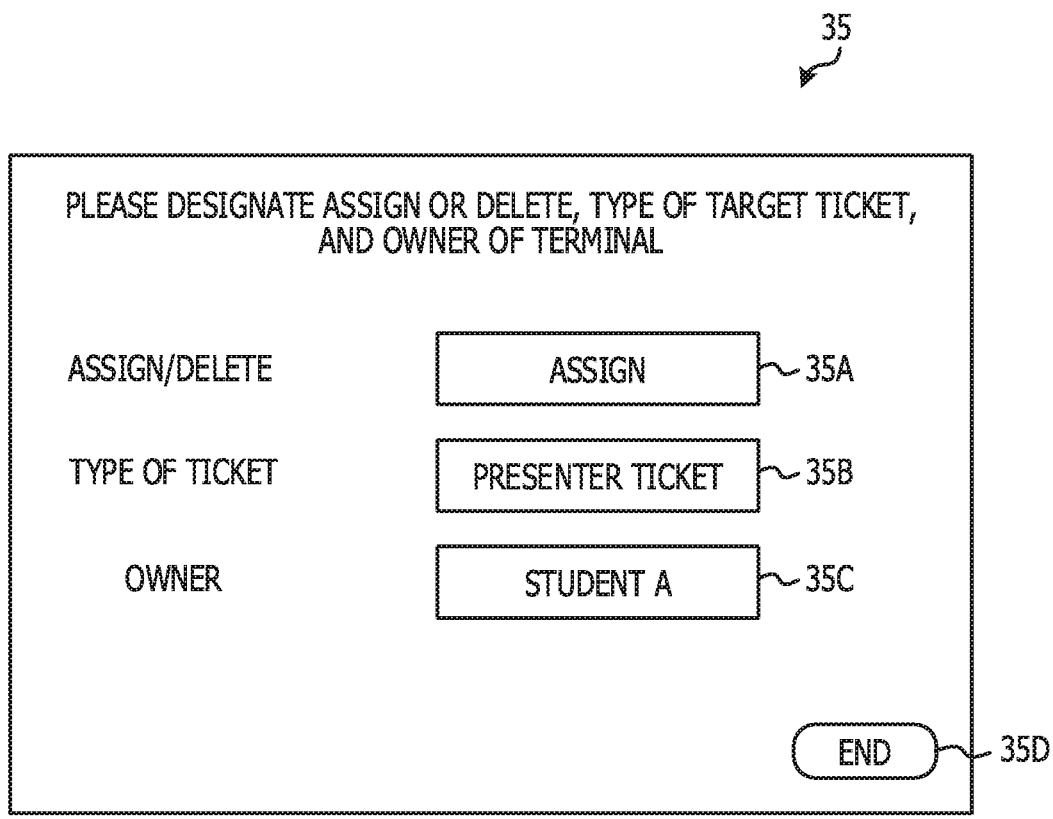
FIG. 14 illustrates a configuration example of ticket operation instruction screen according to the second and third embodiments.

FIG. 14 illustrates the ticket operation instruction screen according to this embodiment. As illustrated in FIG. 14, the ticket operation instruction screen according to this embodiment displays an input area 35A for designating whether to assign or delete ticket information 70. The ticket operation instruction screen according to this embodiment displays an input area 35B for designating the type of target ticket information 70 and an input area 35C for inputting the owner of the target terminal 30.

When the ticket operation instruction screen illustrated in FIG. 14 is displayed on the display unit 35, the teacher inputs the corresponding information into the input areas 35A to 35C of the ticket operation instruction screen through the input unit 34 and designates an "END" button 35D through the input unit 34. When the "END" button 35D is designated, result of the step 302 becomes the affirmative determination, and processing proceeds to the step 304. FIG. 14 illustrates the input condition indicating that the ticket information 70 is assigned, the type of ticket information 70 assigned is "presenter's ticket", and the owner of the terminal 30 to which the ticket information 70 is assigned is "student A". Hereinafter, information inputted on the ticket operation instruction screen is referred to as "ticket assignment/deletion information".

In the step 304, the transmission unit 17 generates the assignment/deletion designation command based on information inputted on the ticket operation instruction screen and transmits to the ticket operation server 60. Then, the specific terminal processing ends.

Figure 15:
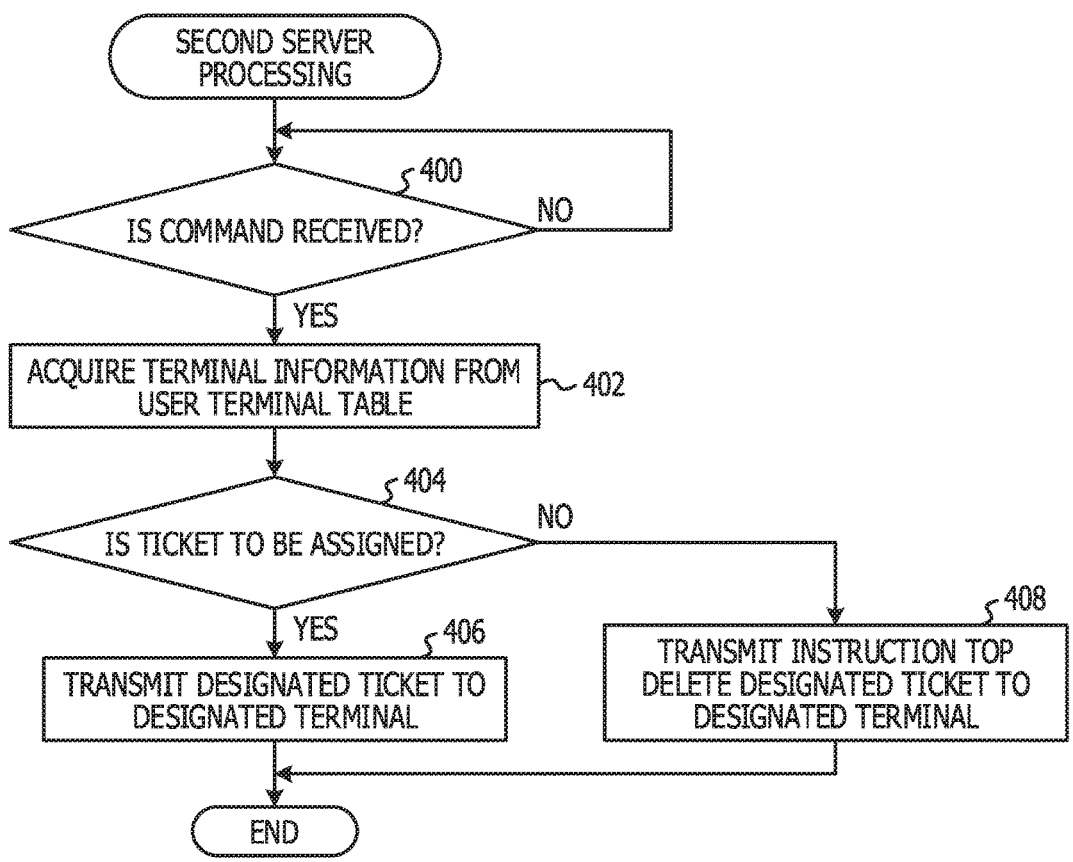
FIG. 15 is a flowchart illustrating an example of a second server processing according to the second and third embodiments.

Meanwhile, the ticket operation server 60 performs the second server processing illustrated in FIG. 15 by executing the second server processing program 63A.

In the step 400 of second server processing, the reception unit 76 waits for reception of the assignment/deletion designation command. When determination of the step 400 is affirmative, the processing proceeds to the step 402. In the step 402, the transmission unit 77 acquires terminal information (in this embodiment, address) corresponding to the identification information included in the received assignment/deletion designation command with reference to the user terminal table 84.

In the next step 404, the transmission unit 77 determines based on the assignment/deletion information included in the received assignment/deletion designation command whether to assign the ticket information 70. If the determination result is affirmative, the processing proceeds to the step 406.

In the step 406, the transmission unit 77 acquires, from the server 20A, the ticket information 70 indicated by the type of the ticket information 70 included in the received assignment/deletion designation command. Then, the transmission unit 77 transmits the acquired ticket information 70 to the terminal 30 corresponding to the terminal information acquired in the processing of the step 402. Then, the second server processing ends.

Meanwhile, when the determination result in the step 404 is negative, it is deemed that deletion of the ticket information 70 is instructed, and processing proceeds to the step 408. In the step 408, the transmission unit 77 identifies the ticket information 70 indicated by the type of the ticket information 70 included in the received assignment/deletion designation command. Then, the transmission unit 77 transmits the deletion instruction information of instructing deletion of the identified ticket information 70 to the terminal 30 corresponding to the terminal information acquired in the processing of the step 402. Then, the second server processing ends.

Figure 16:
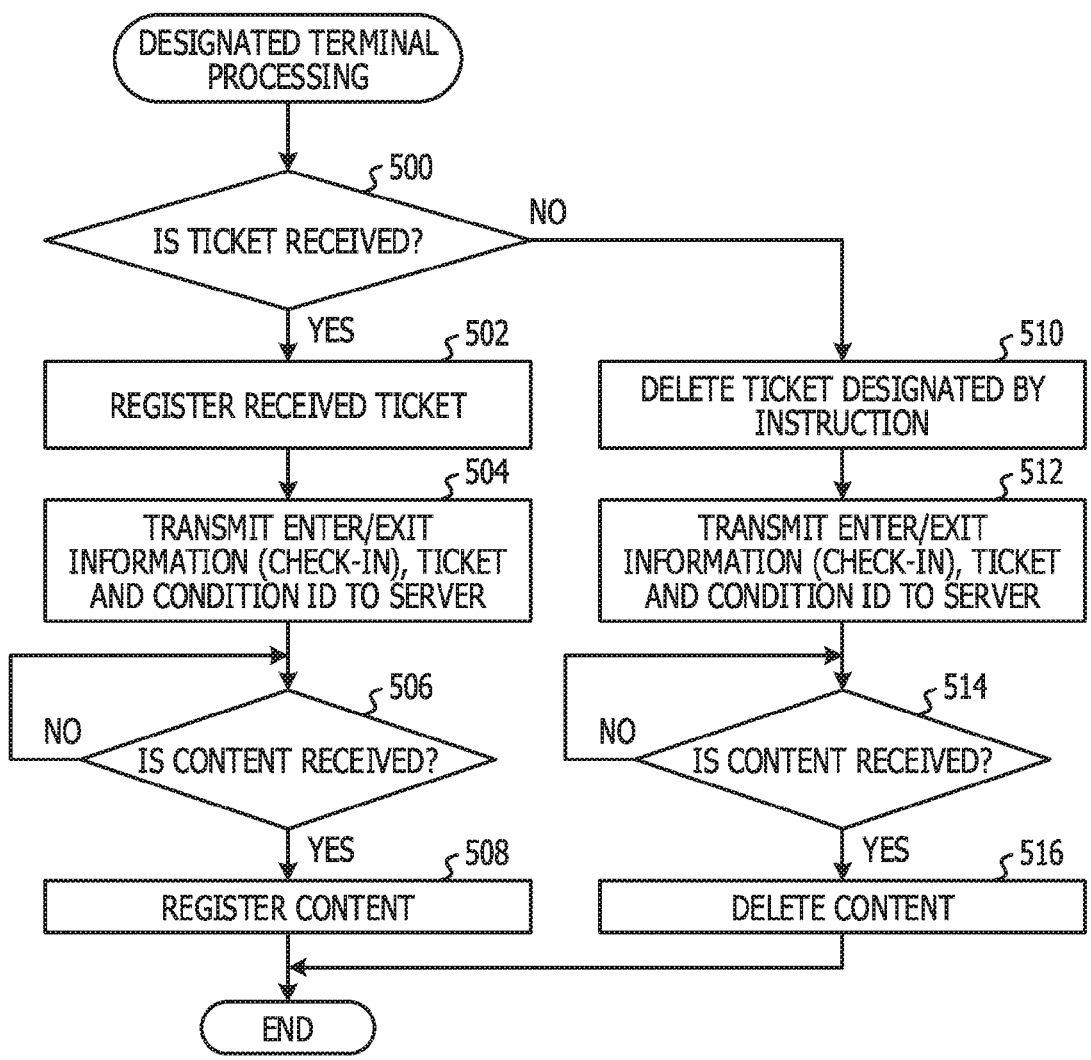
FIG. 16 is a flowchart illustrating an example of a designated terminal processing in accordance with the second and third embodiments.

Meanwhile, upon receiving the ticket information 70 or the deletion instruction information from the ticket operation server 60, the terminal 30 executes the designated terminal processing program and thereby performs the designated terminal processing illustrated in FIG. 16.

In the step 500 of designated terminal processing, the reception unit 18 determines whether the ticket information 70 is received from the ticket operation server 60. If the determination result is affirmative, the processing proceeds to the step 502. In the step 502, the reception unit 18 registers the received ticket information 70 in the memory 32. In the next step 504, the transmission unit 17 transmits the received ticket information 70, the enter/exit information indicating check-in, and the condition ID for each condition ID presently under check-in to the server 20A.

Here, upon receiving the ticket information 70, the condition ID, and the enter/exit information indicating check-in from any terminal 30, the server 20A according to this embodiment identifies the content corresponding to the received information with reference to the prerequisite ticket table 82 and transmits to the terminal 30 of the transmission source.

Then, in the next step 506, the reception unit 18 waits for reception of the content transmitted from the server 20A. In the next step 508, the reception unit 18 stores the received content into the memory 32. Thereafter, the designated terminal processing ends.

Meanwhile, if the determination result in the step 500 is negative, it is deemed that the deletion instruction information has been received from the ticket operation server 60, the processing proceeds to the step 510, and the reception unit 18 deletes the ticket information 70 instructed to delete by the received deletion instruction information from the memory 32. In the next step 512, the transmission unit 17 transmits the received ticket information 70 corresponding to the received deletion instruction information, the enter/exit information indicating check-in, and the condition ID for each condition ID presently under check-in to the server 20A.

Here, upon receiving the ticket information 70, the condition ID, and the enter/exit information indicating check-in from any terminal 30, the server 20A according to this embodiment identifies the content corresponding to the received information with reference to the prerequisite ticket table 82 and transmits to the terminal 30 of the transmission source.

Then, in the step 514, the reception unit 18 waits for reception of the content transmitted from the server 20A. If the determination result in the step 514 is affirmative, the processing proceeds to the step 516. In the step 516, the reception unit 18 deletes a content among contents presently stored in the memory 32 but not included in the received content from the memory 32. Thereafter, the designated terminal processing ends.

Figure 17:
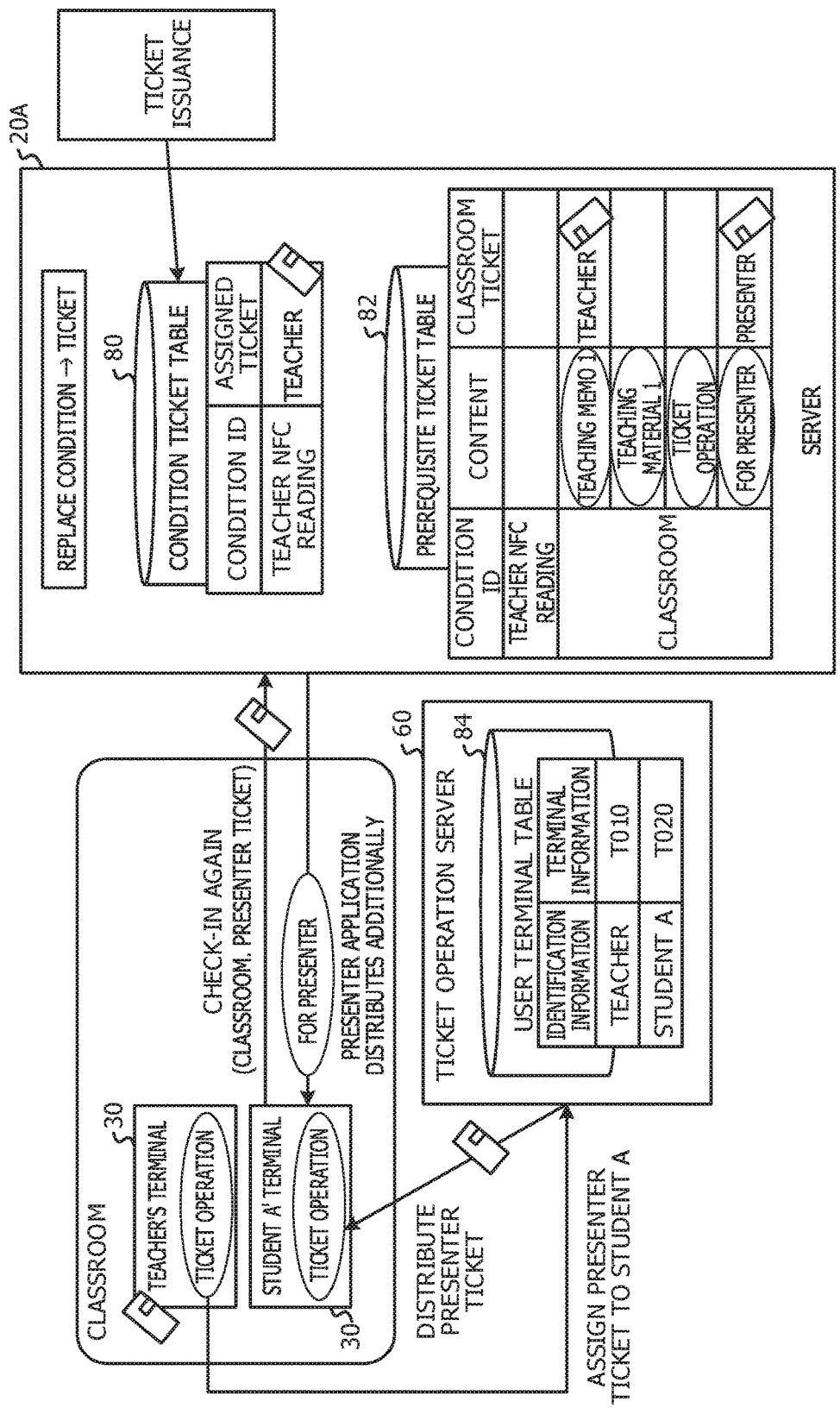
FIG. 17 is a schematic diagram illustrating an example of a processing flow of a computer system according to the second embodiment.

Next, an example of each of processing flows during execution of the specific terminal processing, the second server processing, and the designated terminal processing is described specifically with reference to FIG. 17. Here, the teacher and students exist in the management target classroom, and the teacher assigns the presenter's ticket to a specific student A as the ticket information 70 by using the teacher's terminal 30.

In this case, when the teacher and the student enter the management target classroom, the specific terminal processing program is installed on the teacher's terminal 30, and the designated terminal processing program is installed on the student's terminal 30.

When assigning the presenter's ticket to the student A, the teacher instructs execution of the specific terminal processing program by using the teacher's terminal 30 and thereby starts execution of the specific terminal processing. Then, the teacher inputs the ticket assignment/deletion information on the ticket operation instruction screen displayed by the terminal 30 and causes the ticket operation server 60 to transmit the assignment/deletion designation command.

Upon receiving the assignment/deletion designation command, the ticket operation server 60 performs the second server processing and thereby acquires terminal information (in this case, "T020") corresponding to specific information (in this case, specific information indicating "student A") included in the assignment/deletion designation command with reference to the user terminal table 84. Then, the ticket operation server 60 acquires the ticket information 70 (in this case, "presenter's ticket") of the type designated by the assignment/deletion designation command from the server 20A and transmits to the terminal 30 corresponding to the terminal information.

Upon receiving the ticket information 70, the terminal 30 of the student A starts the designated terminal processing program and thereby starts execution of the designated terminal processing. Then, the terminal 30 of the student A registers the received ticket information 70 into the memory 32 and transmits the received ticket information 70, the condition ID indicating "classroom" and the enter/exit information indicating check-in to the server 20A.

Upon receiving the ticket information 70, the condition ID and the enter/exit information indicating check-in, the server 20A acquires the content (in this case, "presenter's program") corresponding to the received ticket information 70 and the condition ID with reference to the prerequisite ticket table 82. Then, the server 20A transmits the acquired content to the terminal 30 of the transmission source.

Upon receiving the content, the terminal 30 of the student A once stores the received content into the memory 32. Thereafter, the stored content is used by the student A as appropriate.

As described above in detail, in this embodiment, when there is a change in the ticket information 70 received from the terminal 30, the content distributed to the terminal 30 is changed based on the change. Thus, management according to the change in the ticket information 70 may be performed in a more appropriate manner.

In the embodiment described above, the ticket operation device 75 (ticket operation server 60) is newly provided to implement the ticket operation function. However, it is not limited thereto. For example, the ticket operation device 75 may not be provided if the content distribution apparatus 10A (server 20A) is caused to execute the same processing as the ticket operation device 75. Also, for example, the ticket operation device 75 may not be provided if a specific terminal 15 (terminal 30) is caused to perform processing of directly sending the ticket information 70 to another terminal 15 and deleting the ticket information 70. In this case, cost increase due to implementation of the disclosed technique may be suppressed since there is no have to newly provide the ticket operation device 75.

In the embodiment described above, the specific terminal processing program and the designated terminal processing program are distributed from the server 20A as the content. However, it is not limited thereto. For example, the specific terminal processing program or the designated terminal processing program may be pre-installed in each of the terminals 30. In the embodiment described above, when deleting the ticket information, the server 20A transmits a content corresponding to the received information, and the terminal 30 deletes a content not included in the received content. However, it is not limited thereto. The server 20A may transmit the content deletion instruction information to the terminal 30.

Third Embodiment

Next, a third embodiment of the disclosed technique is described. Throughout drawings, the same portion as in the second embodiment is assigned with the same reference numeral, and description thereof is omitted to the most.

Figure 18:
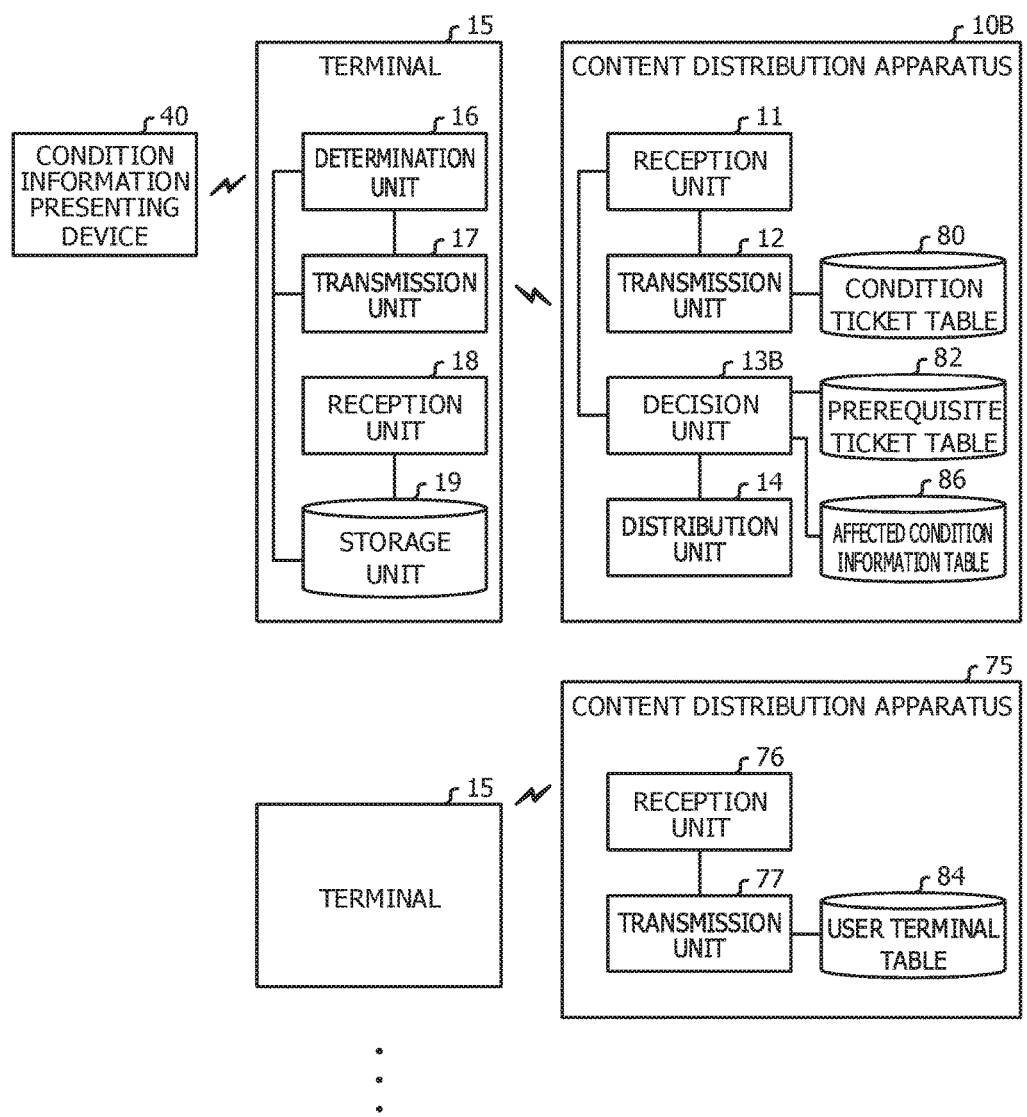
FIG. 18 is a functional block diagram of a content distribution apparatus, a terminal, and a ticket operation device according to the third embodiment.

FIG. 18 illustrates an entire configuration of a system according to the third embodiment. As illustrated in FIG. 18, the system according to the third embodiment is different from the system (see FIG. 10) according to the second embodiment in that the decision unit 13 in the content distribution apparatus 10A is a decision unit 13B configured to perform a processing different from a processing of the decision unit 13.

A content distribution apparatus 10B according to the third embodiment stores an affected condition information table 86 indicating the above condition affected by assignment or deletion of the ticket information 70 to or from the terminal 15, in which the type of the ticket information 70 and various conditions are associated with each other.

Then, when there is a change in the ticket information 70 received from the terminal 15, the decision unit 13B acquires the condition affected by the changed ticket information 70 from the affected condition information table 86, and decides the content corresponding to the acquired condition as a content to be distributed to the terminal 15.

Figure 19:
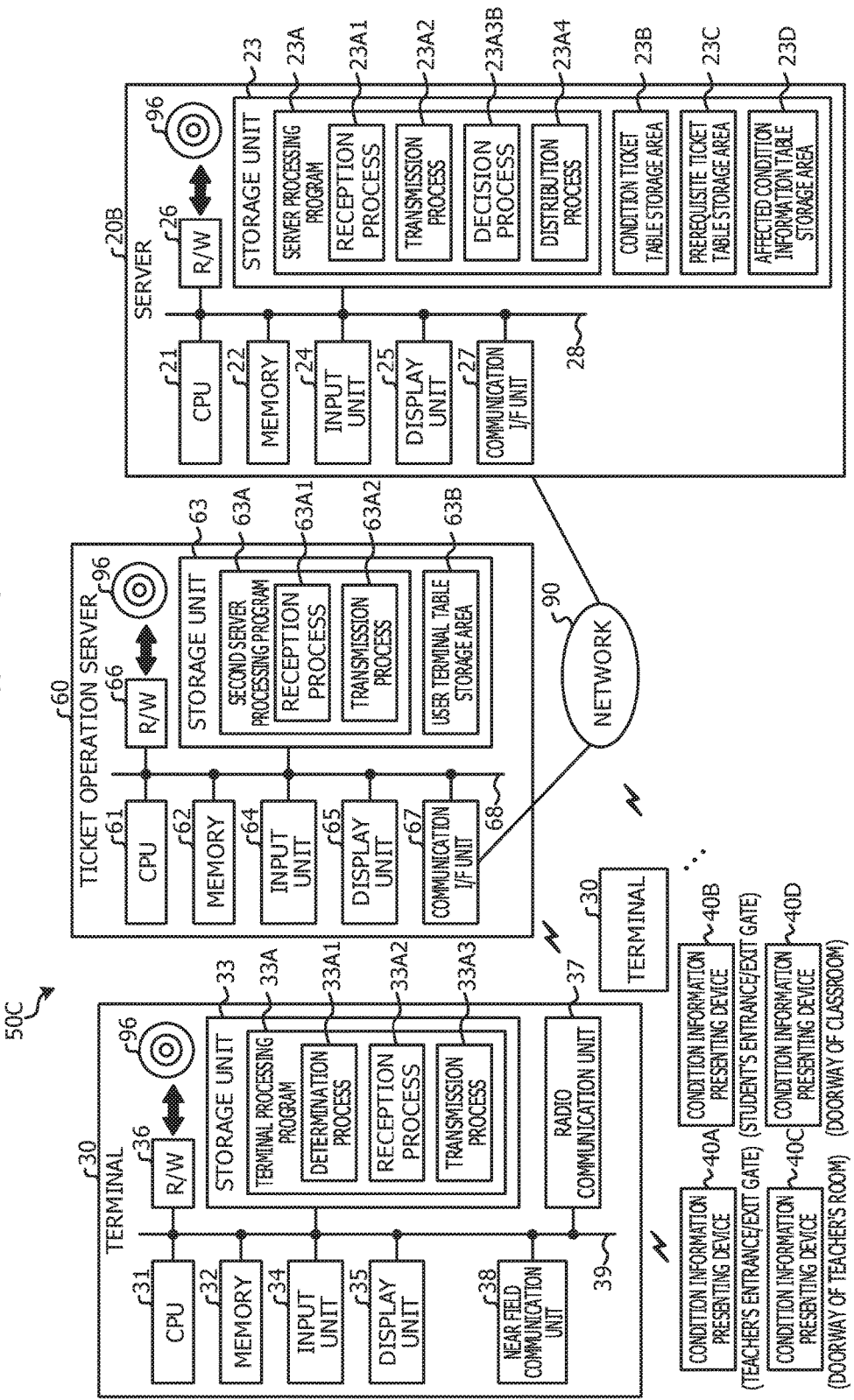
FIG. 19 is a block diagram illustrating a schematic configuration of a computer system according to the third embodiment.

The system according to the third embodiment may be implemented respectively by a server 20B, terminals 30, multiple condition information presenting devices 40A to 40D (four devices in this embodiment), and a ticket operation server 60, which are included in a computer system 50C illustrated in FIG. 19.

As illustrated in FIG. 19, the computer system 50C according to the third embodiment is different from the computer system according to the second embodiment in that a decision process 23A3 of the server 20A is replaced with a decision process 23A3B which performs a processing different from the decision process 23A3.

The CPU 21 operates as the decision unit 13B illustrated in FIG. 18 by executing the decision process 23A3B. By executing the server processing program 23A as described above, the server 20B functions as the content distribution apparatus 10B.

The storage unit 23 is provided with an affected condition information table storage area 23D. When the CPU 21 develops data stored in the affected condition information table storage area 23D into the memory 22, the affected condition information table 86 is generated.

As illustrated in FIG. 20, the affected condition information table 86 according to this embodiment contains various information including the ticket indicating the type of the ticket information 70 and an affected condition group indicating conditions affected by assignment or deletion of the ticket to or from the terminal 30. The affected condition information table 86 illustrated in FIG. 20 indicates, for example, that the conditions affected by assignment or deletion of the ticket information 70 indicating "teacher" to or from the terminal 30 are "in-school", "classroom", and "gymnasium".

Figure 21:
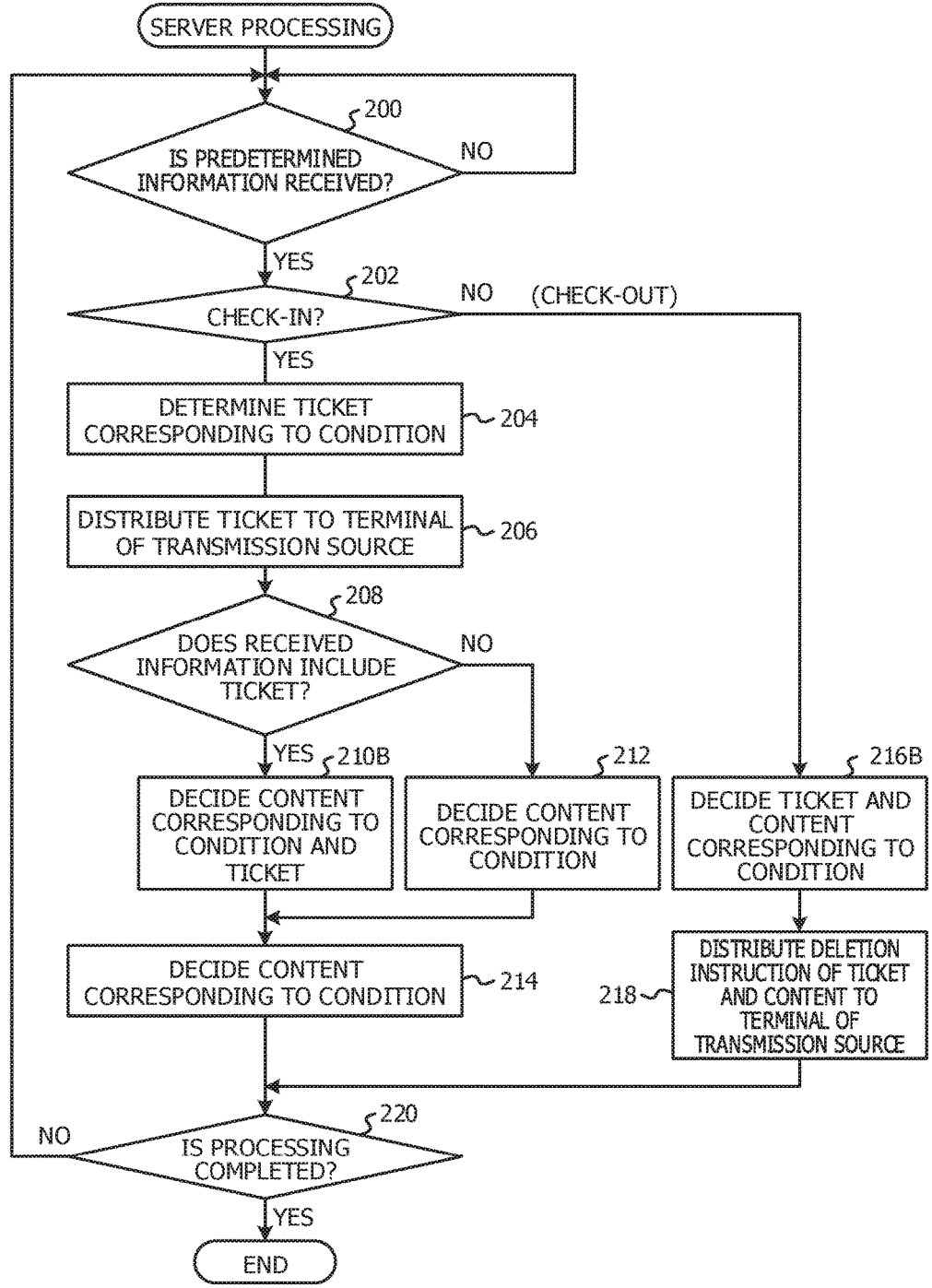
FIG. 21 is a flowchart illustrating an example of a server processing according to the third embodiment.

In the computer system 50C according to this embodiment, the server 20B executes the server processing program 23A to perform server processing illustrated in FIG. 21. Description of steps in the flowchart illustrated in FIG. 21 for executing processing same as the processing according to the first embodiment illustrated in FIG. 7 is omitted by assigning same step numbers as in FIG. 7.

In the step 210B of server processing, the decision unit 13B acquires the affected condition group corresponding to the ticket information 70 received from the terminal 30 with reference to the affected condition information table 86. The decision unit 13B decides the content corresponding to the condition ID indicating the condition indicated by the acquired affected condition group, the condition ID received from the terminal 30, and the ticket information 70 with reference to the prerequisite ticket table 82. Then, the processing proceeds to the step 214. In the step 214, the distribution unit 14 transmits the content decided in the processing of the step 210B or the step 212 to the terminal 30 of the transmission source.

Meanwhile, in the step 216B, the decision unit 13B acquires the affected condition group corresponding to the ticket information 70 received from the terminal 30 with reference to the affected condition information table 86. The decision unit 13B decides the deletion target content corresponding to the condition ID indicating the condition indicated by the acquired affected condition group and the condition ID received from the terminal 30, and the ticket information 70 with reference to the condition ticket table 80 and the prerequisite ticket table 82. In the next step 218, the distribution unit 14 transmits the deletion instruction information for instructing deletion of the content and the ticket information 70 decided in the processing of the step 210B to the terminal 30 of the transmission source.

As describe above in detail, the content distribution apparatus 10B according to this embodiment pre-stores the affected condition information table 86 indicating the conditions affected by assignment or deletion of the ticket information 70 to or from the terminal 30, in which the type of the ticket information 70 and the conditions are associated with each other. Then, in this embodiment, when there is a change in the ticket information 70, the content distribution apparatus 10B recognizes the condition affected by the changed ticket information 70 from the affected condition information table 86, and decides the content corresponding to the recognized condition as a content to be distributed. Thus, even when multiple conditions are combined, a content just corresponding to a condition affected by the change of the ticket information 70 is transmitted to the terminal 30. Therefore, server's management load may be further reduced.

In the embodiment described above, the affected condition information table 86 is provided in the server 20B and is accessed by the server 20B only in a condition affected by operation of the ticket information 70. However, it is not limited thereto. For example, the affected condition information table 86 may be provided in the terminal 30 and is accessed by the terminal 30 only in a condition affected by operation of the ticket information 70. In this case, frequency of access to the server 20B when there is a change of the ticket information 70 in the terminal 30 is reduced. Thus, compared with the above embodiment, load of the server 20B may be reduced.

In the embodiment described above, user attribute information and location information are applied as the condition information. However, it is not limited thereto. Information indicating other conditions which may occur to the terminal 30, such as, for example, information indicating the time and information indicating the temperature may be applied as the condition information. In this case, the terminal 30 may receive condition information indicating the time and condition information indicating the temperature from the condition information presenting device 40 or may acquire from a timer or a temperature sensor of the terminal 30.

In the embodiment described above, the content is stored by the server 20A (20B). However, it is not limited thereto. For example, the content may be registered in an external server such as, for example, a server of a publishing company that provides the content. In this case, the server 20A (20B) downloads a content to be used from an external server via such as, for example, the network 90.

In the above embodiment, the content distribution method according to the disclosed technique is applied to a computer system at the education site. However, it is not limited thereto. For example, the content distribution method according to the disclosed technique may be applied to other sites such as, for example, a company and a shopping center. In this case, a conference room in the company and a store in the shopping center correspond to the management target classroom in the above embodiments. In this case, the title such as general manager, manager, and store manager may be applied as the user attribute information.

In the embodiment described above, the server processing program 23A, the terminal processing program 33A and the second server processing program 63A are read from the recording medium 96 into the storage unit via the medium read/write device 26 (36, 66). However, it is not limited thereto. For example, these programs may be prestored (installed) in a compatible device, or may be downloaded into the storage unit from an external device via the network 90.

All references, patent applications and technical standards recited herein are incorporated herein by reference to an extent same as that incorporation of individual references, patent applications and technical standards by reference are specifically and individually stated.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A content distribution method comprising:
   receiving, at a content control system from a mobile terminal at a first location, first information and first entrance/exit information, the first information indicating a non-unique attribute of a user of the mobile terminal, the first entrance/exit information being generated in accordance with a passage of the mobile terminal at the first location;
   transmitting, when the first entrance/exit information indicates entrance, from the content control system to the mobile terminal, second information corresponding to the non-unique attribute of the user of the mobile terminal based on the first information;
   receiving, at the content control system from the mobile terminal, the second information, third information and second entrance/exit information, the third information indicating a second location of the mobile terminal different from the first location, the second entrance/ exit information being generated in accordance with a passage of the mobile terminal at the second location;
   transmitting, when the second entrance/exit information indicates entrance, from the content control system to the mobile terminal, a content that is selected from among a plurality of contents based on the second information and the third information; and
   automatically deleting the content stored in the mobile terminal when third entrance/exit information is generated in accordance with another passage of the mobile terminal at the second location, the third entrance/exit information indicating exit.

2. The content distribution method according to claim 1, wherein
   the mobile terminal obtains the first information by near field communication (NFC) with a device relating to the non-unique attribute of the user of the mobile terminal upon the passage of the mobile terminal at the first location, and
   the mobile terminal obtains the third information by NFC with another device located in the second location upon the passage of the mobile terminal at the second location.

3. The content distribution method according to claim 1, wherein
   the first information, the second information, and the third information are wirelessly transmitted from the mobile terminal, and
   the second information and the content are wirelessly received by the mobile terminal.

4. The content distribution method according to claim 1, wherein the first information indicates a role of the user of the mobile terminal.

5. A content distribution apparatus comprising:
   a memory; and
   a processor coupled to the memory and configured to:
      receive, from a mobile terminal, first information and first entrance/exit information, the first information indicating a non-unique attribute of a user of the mobile terminal, the first entrance/exit information being generated in accordance with a passage of the mobile terminal at the first location,
      transmit, to the mobile terminal when the first entrance/exit information indicates entrance, second information relating to the non-unique attribute of the user of the mobile terminal based on the first information,
      receive, from the mobile terminal, the second information, third information and second entrance/exit information, the third information indicating a location of the mobile terminal, the second entrance/exit information being generated in accordance with a passage of the mobile terminal at the second location,
      transmit, when the second entrance/exit information indicates entrance, a content that is selected from among a plurality of contents based on the second information and the third information, and
      automatically delete the content stored in the mobile terminal when entrance/exit information is generated in accordance with another passage of the mobile terminal at the second location, the third entrance/exit information indicating exit.

6. The content distribution apparatus according to claim 5, wherein
   the mobile terminal obtains the first information by near field communication (NFC) with a device relating to the non-unique attribute of the user of the mobile terminal upon the passage of the mobile terminal at the first location, and
   the mobile terminal obtains the third information by NFC with another device located in the location upon the passage of the mobile terminal at the second location.

7. The content distribution apparatus according to claim 5, wherein
   the first information, the second information, and the third information are wirelessly transmitted from the mobile terminal, and
   the second information and the content are wirelessly received by the mobile terminal.

8. The content distribution apparatus according to claim 5, wherein
the first information indicates a role of the user of the mobile terminal.

9. A non-transitory computer-readable storage medium storing a program that causes a computer to execute a process, the computer including a memory, the process comprising:
receiving, from a mobile terminal, first information and first entrance/exit information, the first information indicating a non-unique attribute of a user of the mobile terminal, the first entrance/exit information being generated in accordance with a passage of the mobile terminal at the first location;
transmitting, to the mobile terminal when the first entrance/exit information indicates entrance, second information relating to the non-unique attribute of the user of the mobile terminal based on the first information;
receiving, from the mobile terminal, the second information, third information and second entrance/exit information, the third information indicating a location of the mobile terminal, the second entrance/exit information being generated in accordance with a passage of the mobile terminal at the second location;
transmitting when the second entrance/exit information indicates entrance, a content that is selected from among a plurality of contents based on the second information and the third information; and
automatically deleting the content stored in the mobile terminal when third entrance/exit information is generated in accordance with another passage of the mobile terminal at the second location, the third entrance/exit information indicating exit.

10. The content distribution method according to claim 1, further comprising, prior to said deleting,
receiving, at the content control system from the mobile terminal, fourth information indicating the third location of the mobile terminal different from the second location; and
transmitting, from the content control system to the mobile terminal, a command to delete the content in response to said receiving of the fourth information.

11. The content distribution method according to claim 1, wherein the mobile terminal obtains the first information by wireless communication with a device associated with the non-unique attribute of the user of the mobile terminal upon the passage of the mobile terminal at the first location.

12. The content distribution method according to claim 1, wherein the mobile terminal obtains the first information by wireless communication with a condition information presenting device at the first location disposed in three-dimensional space where the user carries the mobile terminal within wireless communication with the condition information presenting device.

13. The content distribution method according to claim 1, further comprising:
receiving, at the content control system from another mobile terminal at a third location, fourth information indicating a different attribute of another user of the other mobile terminal;
transmitting, from the content control system to the other mobile terminal, fifth information corresponding to the different attribute of the other user of the other mobile terminal based on the fourth information;
receiving, at the content control system from the other mobile terminal, the fifth information and the third information indicating the second location of the other mobile terminal; and
transmitting, from the content control system to the other mobile terminal, different content that is selected from among the plurality of contents based on the fifth information and the third information.

14. The content distribution method according to claim 1, wherein a first number of mobile terminals are carried by the first number of different users and during said receiving at the first location, a second number, larger than one and smaller than the first number, of the mobile terminals receive the second information corresponding to a single attribute that is in common among the second number of the users.

15. A content distribution system, comprising:
mobile terminals including a first mobile terminal and a second mobile terminal;
a first presenting device at a first location in three-dimensional space, the first presenting device including first circuitry configured to communicate wirelessly with at least the first mobile terminal among the mobile terminals, when within wireless communication range, to send first information and first entrance/exit information to the first mobile terminal, the first information indicating a first non-unique attribute of a first user of the first mobile terminal, the first entrance/exit information being generated in accordance with a passage of the first mobile terminal at the first location;
a second presenting device at a second location in three-dimensional space, different from the first location, the second presenting device including second circuitry configured to
communicate wirelessly with at least the second mobile terminal among the mobile terminals when within wireless communication range, and
send second information and second entrance/exit information to the second mobile terminal, the second information indicating a second non-unique attribute of a second user of the second mobile terminal, different from the first non-unique attribute of the first user, the second entrance/exit information being generated in accordance with a passage of the second mobile terminal at the second location;
a server including third circuitry configured to
communicate with the mobile terminals,
receive the first information and the first entrance/exit information from the first mobile terminal and the second information and the second entrance/exit information from the second mobile terminal, and
send third and fourth information corresponding to the first non-unique attribute and the second non-unique attribute based on the first and second information, respectively; and
a third presenting device at a third location in three-dimensional space, different from the first and second locations, the third presenting device including fourth circuitry configured to
send fifth information representing the third location and third entrance/exit information generated in accordance with passage of the mobile terminals at the third location to the mobile terminals when within wireless communication range, the first and second mobile terminals transmitting the third and fourth information, respectively, along with the fifth information to the server, receive from the server when the first and second entrance/exit information indicate entrance, first and second data differing in content, respectively, based on the fifth information and the third and fourth information, respectively, and send the first and second data to the first and second mobile terminals, respectively, wherein the second presenting device sends third entrance/exit information in accordance with a next passage of the second mobile terminal at the second location, the third entrance/exit information indicating exit, and wherein the second mobile terminal automatically deletes the second data when the third entrance/exit information is received.

16. The content distribution system according to claim 15, wherein the first and second entrance/exit information are respectively generated in accordance with a number of the passage of the first mobile terminal and the second mobile terminal at the first and second locations, respectively, the first entrance/exit information indicates entrance into or exit from the first location, and the second entrance/exit information indicates entrance into or exit from the second location.

17. The content distribution method according to claim 1, wherein the first entrance/exit information is generated in accordance with a number of the passage of the mobile terminal at the first location, and the first entrance/exit information indicates entrance into the first location or exit from the first location.

18. The content distribution apparatus according to claim 5, wherein the first entrance/exit information is generated in accordance with a number of the passage of the mobile terminal at the first location, and the first entrance/exit information indicates entrance into the first location or exit from the first location.

19. The non-transitory computer-readable storage medium according to claim 9, wherein the first entrance/exit information is generated in accordance with a number of the passage of the mobile terminal at the first location, and the first entrance/exit information indicates entrance into the first location or exit from the first location.

* * * * *